(12) United States Patent
Watanabe et al.

(10) Patent No.: US 9,170,722 B2
(45) Date of Patent: Oct. 27, 2015

(54) DISPLAY CONTROL DEVICE, DISPLAY CONTROL METHOD, AND PROGRAM

(75) Inventors: Kazuhiro Watanabe, Tokyo (JP); Masaaki Isozu, Tokyo (JP); Takehiko Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 13/400,847

(22) Filed: Feb. 21, 2012

(65) Prior Publication Data

US 2012/0223898 A1   Sep. 6, 2012

(30) Foreign Application Priority Data

Mar. 4, 2011   (JP) ................ P2011-047890

(51) Int. Cl.
*G06F 3/041* (2006.01)
*G06F 3/0484* (2013.01)
*G06F 3/0485* (2013.01)
*G06F 3/0488* (2013.01)

(52) U.S. Cl.
CPC .......... *G06F 3/04847* (2013.01); *G06F 3/0485* (2013.01); *G06F 3/04883* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2005/0028198 A1* | 2/2005 | Robbins | 725/39 |
| 2006/0026536 A1* | 2/2006 | Hotelling et al. | 715/863 |
| 2010/0123734 A1* | 5/2010 | Ozawa et al. | 345/619 |
| 2010/0283743 A1 | 11/2010 | Coddington | |
| 2010/0289825 A1* | 11/2010 | Shin et al. | 345/667 |

FOREIGN PATENT DOCUMENTS

| | | |
|---|---|---|
| JP | 2009282606 A | 12/2009 |
| JP | 2010122856 A | 6/2010 |
| JP | 2012511774 A | 5/2012 |
| WO | 2010077430 A1 | 7/2010 |

OTHER PUBLICATIONS

James Chisan et al., Video Bench Final Report (XP-002662427), University of Victoria, Apr. 11, 2003, p. 1-48.*
Japanese Office Action for Application No. 2011047890, dated Nov. 4, 2014.

(Continued)

*Primary Examiner* — Nicholas Lee
(74) *Attorney, Agent, or Firm* — Sony Corporation

(57) ABSTRACT

Provided is a display control device including an operation display unit for detecting operation positions, on a display screen, in accordance with a user operation on the display screen, a state determination unit for determining, based on a detection result of the operation positions, a first operation state where two operation positions are detected, a process determination unit for determining, based on a change in the operation positions in the first operation state, a process related to display that is to be performed, and a display control unit for performing, based on a determination result of a process, a process which has been determined to be performed, and causing the display screen to perform display corresponding to the process. The display control unit continues the display corresponding to the process which has been determined to be performed, according to a duration of determination for the process which has been determined.

7 Claims, 26 Drawing Sheets

(56) References Cited

OTHER PUBLICATIONS

"Week Calendar: Synchronization with Standard Calendar! 'Operation Feeling of Display on Weekly Basis' not included in standard calendar is double circle (means 'excellent'), 3622", [online], Dec. 6, 2010, Appbank, p. 1-7, [Retrieval date] Oct. 16, 2014, Internet <http://web.archive.org/web/20121130033921/http://www.appbank.net/2010/12/06/iphone-application/195610.php>; concise explanation of relevance in JP Office Action for Application No. 2011047890, dated Nov. 4, 2014.

Japanese Office Action issued on Mar. 3, 2015 in patent application No. 011-047890.

* cited by examiner

● TOUCH POINT
(OPERATION POSITION)

● TOUCH POINT

DISPLAY CONTROL DEVICE, DISPLAY CONTROL METHOD, AND PROGRAM

CROSS-REFERENCE TO RELATED APPLICATION

The present application claims priority from Japanese Patent Application No. JP 2011-047890 filed in the Japanese Patent Office on Mar. 4, 2011, the entire content of which is incorporated herein by reference.

BACKGROUND

The present disclosure relates to a display control device, a display control method, and a program.

These days, devices, for example, a communication device such as a smartphone, provided with a touch panel allowing display of a display screen and a user operation on the display screen are becoming widespread. Some of these devices are capable of detecting one or more user operations on the display screen (hereinafter, sometimes referred to as a "multi-touch gesture"). A multi-touch user interface (hereinafter, sometimes referred to as a "multi-touch UI") that enables the multi-touch gesture is an important technology from the standpoint of providing more intuitive operation to users.

SUMMARY

By using a device adopting the multi-touch UI, a user is enabled to perform more intuitive operation, and thus can change the display on the display screen by, for example, enlarging the display size of display content displayed on the display screen or reducing the display size. Accordingly, a device adopting the multi-touch UI possibly increases the convenience of users.

Here, if the device adopting the multi-touch UI is a mobile device such as a smartphone, for example, the display screen on which a user is to perform an operation may not be large enough for the user to perform the operation. In such a case, the user may have to repeatedly perform a predetermined multi-touch gesture such as a pinch-in gesture or a pinch-out gesture, for example, to cause the display on the display screen to be desirable display. Additionally, a case in which the user has to repeatedly perform a predetermined multi-touch gesture several times, as described above, may also arise even if the display screen on which the user is to perform an operation is large enough. Accordingly, the convenience of the user is not necessarily increased even if the device adopting the multi-touch UI is used.

The present disclosure proposes a display control device, a display control method, and a program which are novel and improved, and which are capable of increasing the convenience of users.

According to an embodiment of the present disclosure, there is provided a display control device which includes an operation display unit for displaying a display screen, and detecting one or more operation positions, on the display screen, in accordance with a user operation on the display screen, a state determination unit for determining, based on a detection result of the operation positions, a first operation state where two operation positions are detected, a process determination unit for determining, based on a change in the operation positions in the first operation state, a process related to display that is to be performed, and a display control unit for performing, based on a determination result of a process, a process which has been determined to be performed, and causing the display screen to perform display corresponding to the process. The display control unit continues the display corresponding to the process which has been determined to be performed, according to a duration of determination for the process which has been determined.

According to this configuration, the convenience of users can be increased.

In a case the process which has been determined is a process of changing display by enlarging or reducing a time axis where a display screen on which a list of images arranged on the time axis is displayed is being displayed, the display control unit may change the display by enlarging or reducing the time axis according to the duration of determination.

The display screen on which the list of images arranged on the time axis is displayed may be a display screen on which the time axis is shown in a spiral manner.

In a case the process which has been determined is a process of increasing or reducing a display size of display content displayed on the display screen, the display control unit may increase or reduce the display size of display content according to the duration of determination.

The process determination unit may calculate an area change speed that is based on a distance between two operation positions that are detected and an area change amount, indicating an amount of change in display, that is based on the area change speed, and may determine a type of the process to be performed based on the area change speed which has been calculated and decide the amount of change in display based on the area change amount which has been calculated.

The process determination unit may further calculate a product of a previously calculated area change speed and a currently calculated area change speed, and may determine, in a case a value of the product which has been calculated is a negative value, that a repetitive operation has been performed, and may determine a process corresponding to the repetitive operation as the process to be performed.

The process determination unit may further determine a type of the process corresponding to the repetitive operation based on the currently calculated area change speed.

The state determination unit may further determine, based on the detection result of the operation positions, a change from the first operation state to a second operation state where the operation positions are not detected. The process determination unit may calculate an integrated value of the calculated area change amount. In a case the process determination unit calculates the integrated value, the display control unit do not have to perform the process which has been determined to be performed, until the state determination unit determines that the change to the second operation state has taken place, may cause the display screen to display a process result candidate indicating a process result which will be obtained when the process is performed according to the integrated value, and may cause the display screen to perform display corresponding to the process result candidate, when the change to the second operation state is determined to have taken place.

The display control unit may cause the process result candidate to be displayed in a pop-up window.

The display control unit may cause display content which will be obtained when the process is performed according to the integrated value to be displayed as the process result candidate.

The display control unit may cause text information corresponding to display content which will be obtained when the process is performed according to the integrated value to be displayed as the process result candidate.

The state determination unit may further determine, based on the detection result of the operation positions, a change from the first operation state to a third operation state where one or three or more operation positions are detected. When the change to the third operation state is determined to have taken place, the display control unit may temporarily suspend execution of a process that is being performed or may cause display content before execution of the process that is being performed to be display content of the display screen.

The state determination unit may further determine, based on the detection result of the operation positions, a change from the third operation state to the first operation state. The display control unit may restart, when the change to the first operation state is determined to have taken place, execution of the process that is temporarily suspended.

According to another embodiment of the present disclosure, there is provided a display control method which includes determining, based on a detection result, at an operation display unit for displaying a display screen and detecting one or more operation positions on the display screen in accordance with a user operation on the display screen, of the operation positions, a first operation state where two operation positions are detected, determining, based a change in the operation positions in the first operation state, a process related to display that is to be performed, and performing, based on a determination result of a process, a process which has been determined to be performed, and causing the display screen to perform display corresponding to the process. In the step of causing the display screen to perform display, the display corresponding to the process which has been determined to be performed is continued according to a duration of determination for the process which has been determined.

By using this method, the convenience of users can be increased.

According to another embodiment of the present disclosure, there is provided a program for causing a computer to perform determining, based on a detection result, at an operation display unit for displaying a display screen and detecting one or more operation positions on the display screen in accordance with a user operation on the display screen, of the operation positions, a first operation state where two operation positions are detected, determining, based a change in the operation positions in the first operation state, a process related to display that is to be performed, and performing, based on a determination result of a process, a process which has been determined to be performed, and causing the display screen to perform display corresponding to the process. In the step of causing the display screen to perform display, the display corresponding to the process which has been determined to be performed is continued according to a duration of determination for the process which has been determined.

By using this program, the convenience of users can be increased.

According to the present disclosure, the convenience of users can be increased.

DETAILED DESCRIPTION OF THE EMBODIMENT(S)

Figure 1:
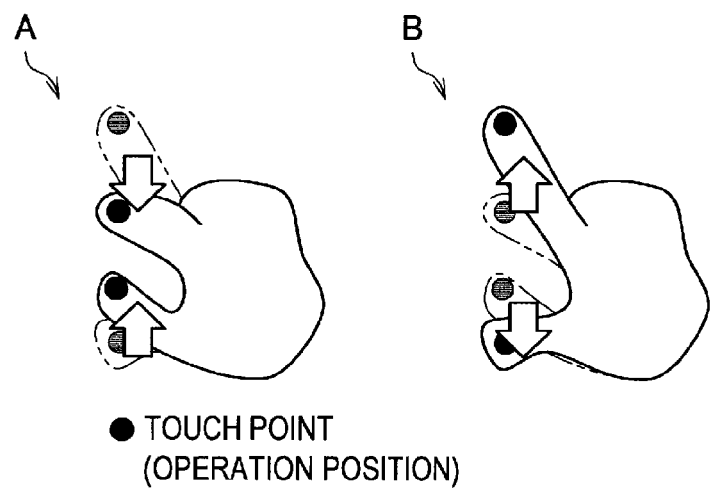
FIG. 1 is an explanatory diagram showing an example of a multi-touch gesture.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, the explanation will be given below in the following order.

1. Display Control Method according to Present Embodiment
2. Display Control Device according to Present Embodiment
3. Program according to Present Embodiment (Display Control Method According to Present Embodiment)

Before giving an explanation of a configuration of a display control device (hereinafter, sometimes referred to as a "display control device 100") according to the present embodiment, a display control method according to the present embodiment will be described. In the following, an explanation will be given assuming that the display control device 100 performs processes related to the display control method according to the present embodiment.

Furthermore, in the following, an example will be described in which the display control device 100 includes an operation display unit that displays a display screen and that detects one or more operation positions on the display screen based on a user operation on the display screen (that is, an operation display unit that is capable of detecting operation positions of a multi-touch gesture, of which more later), and controls display on the display screen displayed on the operation display unit. Additionally, in the present embodiment, the operation display unit and a structural element for controlling display (for example, a structural element that performs processes related to the display control method, described below, according to the present embodiment) may be separate bodies. In this case, the display control device 100 according to the present embodiment will function as a display control system according to which a device related to the structural element for controlling display controls, by wired communication/wireless communication, display at a device serving as the operation display unit.

FIG. 1 is an explanatory diagram showing an example of a multi-touch gesture. A shown in FIG. 1 shows an example of a pinch-in gesture, and B shown in FIG. 1 shows an example of a pinch-out gesture. The pinch-in gesture here is an operation of reducing, for two operation positions (hereinafter, sometimes referred to as "touch point(s)"), the gap therebetween (or the distance between the two operation positions). Also, the pinch-out gesture is an operation of increasing the gap between two operation positions (or the distance between the two operation positions).

In the case a multi-touch UI is adopted by the display control device, if, for example, the display control device performs a reduction process of reducing the display size of display content (hereinafter, sometimes referred to as a "display area") displayed on the display screen when a user performs the pinch-in gesture, the operation of the user and the result of the process performed can be made to conceptually coincide with each other. Also, in the above case, if, for example, the display control device performs an enlargement process of increasing the display size of display content displayed on the display screen when the user performs the pinch-out gesture, the operation of the user and the result of the process performed can be made to conceptually coincide with each other. Thus, for example, by making the operation of the user and the result of the process performed conceptually coincide with each other, as described above, the user is enabled to perform a more intuitive operation and the convenience of the user can be possibly increased.

In the following, the display control method according to the present embodiment will be described taking the pinch-out gesture as shown in B of FIG. 1 as an example. Additionally, the process related to the display control method according to the present embodiment that is performed in a case the pinch-in gesture as shown in A of FIG. 1 is performed is basically the same as the process related to the display control method according to the present embodiment that is performed in a case the pinch-out gesture as shown in B of FIG. 1 is performed (however, the processes will differ in their results). Accordingly, in the following, a case in which the pinch-out gesture as shown in B of FIG. 1 is performed will be mainly described as an example, and an explanation will be omitted for the process related to the display control method according to the present embodiment that is performed in a case the pinch-in gesture as shown in A of FIG. 1 is performed.

[Issue with Multi-Touch UI of Related Art]

As described above, by using a device adopting a multi-touch UI, a user is enabled to perform a more intuitive operation, and thus a device adopting a multi-touch UI can possibly increase the convenience of a user. However, as described above, using a device adopting a multi-touch UI does not inevitably increase the convenience of a user. Before describing the display control method according to the present embodiment, an example of an issue that may arise with a device of related art adopting a multi-touch UI (hereinafter, sometimes referred to as a "display control device of related art") will be described. Additionally, in the following, an example of an issue that may arise with a display control device of related art will be described, taking a case in which a pinch-out gesture as shown in B of FIG. 1 is performed as an example.

Figure 2:
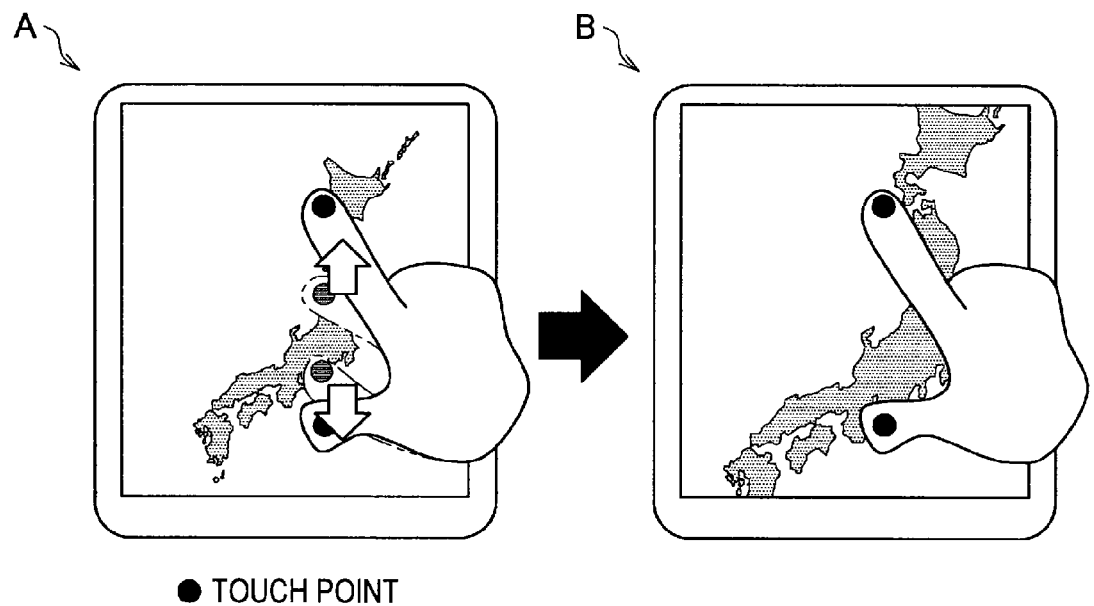
FIG. 2 is an explanatory diagram showing an example of an issue that may arise with a display control device of related art.

FIG. 2 is an explanatory diagram showing an example of an issue that may arise with a display control device of related art. Here, FIG. 2 shows a case in which a map (an example of display content) displayed on a display screen is enlarged by a pinch-out gesture.

A user performs a pinch-out gesture on the display screen of the display control device of related art (A shown in FIG. 2), and the map displayed on the display screen is thereby enlarged (B shown in FIG. 2). However, if the user wishes to display the map in a further enlarged manner when the size of the display screen is small or when it is difficult to further increase the gap between the operation positions (or the distance between two operation positions; same below) than the present, the user using the display control device of related art has to further perform the pinch-out gesture. That is, when using the display control device of related art, the user has to perform the pinch-out gesture several times or display on the display screen may not be made desirable display.

Here, as a way of reducing the number of pinch-out gestures, using an inertia action may be conceived, for example. However, since the inertia action is dependent on the operation speed at the time of performing the pinch-out gesture, for example, use of the inertia action may lead to map enlargement that is not intended by the user. In this case, the user has to further perform a pinch-in gesture to adjust the displayed map to a desired size. Accordingly, when using the inertia action, a process result desired by the user may not be obtained, and further, the number of operations of the user may not be reduced.

Accordingly, using the display control device of related art does not necessarily increase the convenience of the user.

[Overview of Display Control Method according to Present Embodiment]

As has been described, in a case a user operation has to be performed several times with the multi-touch UI to make display on the display screen desired display, there is no way to increase the convenience of the user. Thus, with the display control device 100 according to the present embodiment, an operation state is determined based on the operation position on the display screen, and a process to be performed is determined based on the operation state which has been determined. Then, the display control device 100 performs the process which has been determined, and continues display corresponding to the process according to the duration of the process being performed. For example, in the case the process to be performed is a reduction process according to the pinch-in gesture or an enlargement process according to the pinch-out gesture, the display control device 100 continues to enlarge or reduce the display size of display content according to the duration of the process. That is, in this case, the display control device 100 varies the enlargement rate or reduction rate of the display size according to the duration of the process. The duration of the process to be performed here corresponds to the duration of determination regarding a process which is determined to be performed, for example.

Here, as an operation state to be determined by the display control device 100 according to the present embodiment, there are a first operation state in which two operation positions are detected, a second operation state in which no operation position is detected, and a third operation state in which one or three or more operation positions are detected, for example. Additionally, the operation state to be determined by the display control device 100 is not limited to the first operation state, the second operation state or the third operation state described above. For example, the display control device 100 may also determine transition (change) of the operation state such as a change from the first operation state to the second operation state, a change from the first operation state to the third operation state, or a change from the third operation state to the first operation state.

Figure 3:
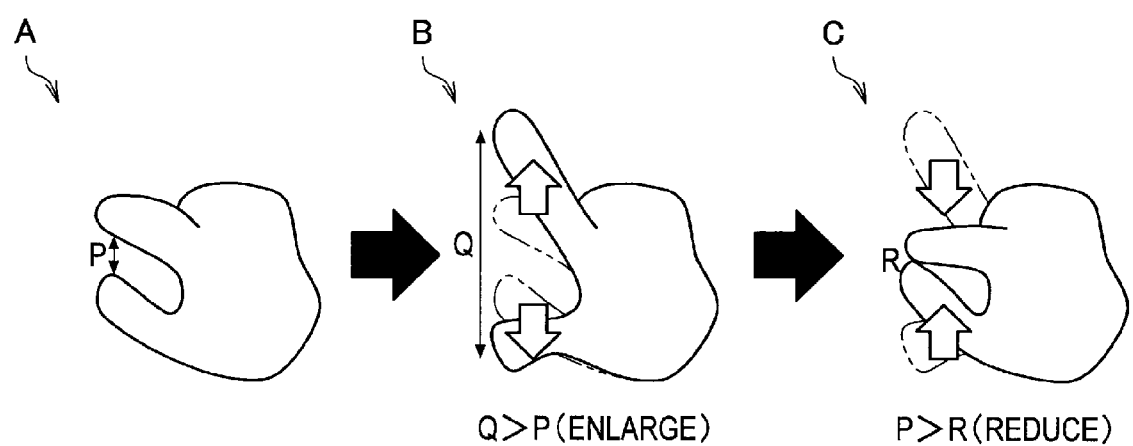
FIG. 3 is an explanatory diagram showing an example of a determination method of a process, of a display control device according to the embodiment, that is to be performed based on an operation position on a display screen.

FIG. 3 is an explanatory diagram showing an example of a determination method of a process, of the display control device 100 according to the present embodiment, that is to be performed based on an operation position on the display screen. FIG. 3 shows here examples of cases where the display control device 100 determines that a pinch-in gesture or a pinch-out gesture has been performed, according to the gap between two operation positions.

For example, the display control device 100 takes the gap between the operation positions that is detected first (a gap P shown in A of FIG. 3; hereinafter, sometimes referred to as a "reference gap") as a threshold, and then determines that a pinch-in gesture or a pinch-out gesture is performed. For example, as shown in B of FIG. 3, if a gap Q is larger than the reference gap P (or if the gap Q is equal to or more than the reference gap P), the display control device 100 determines that a pinch-out gesture is performed, and determines to perform an enlargement process corresponding to the pinch-out gesture. Also, as shown in C of FIG. 3, if a gap R is smaller than the reference gap P (or if the gap R is equal to or less than the reference gap P), the display control device 100 determines that a pinch-in gesture is performed, and determines to perform a reduction process corresponding to the pinch-in gesture.

As shown in FIG. 3, for example, by determining a process to be performed based on a gap between two operation positions, the display control device 100 can realize easy switching between enlargement and reduction of display. Additionally, it is needless to say that the determination method, of the display control device 100 according to the present embodiment, of a process to be performed based on the operation position on the display screen is not limited to the above.

With the display control device 100 continuing display corresponding to a process according to the duration of the process (duration of determination; same below), a user is enabled to cause the display control device 100 to perform desirable display without the number of operations being increased and regardless of the size of the display screen, for example. Accordingly, the display control device 100 can prevent reduction in the convenience of the user caused by increase in the number of operations, and thus can increase the convenience of the user.

[Example of Display Control According to Present Embodiment]

Next, an example of display control realized by using the display control method according to the present embodiment will be described.

(1) First Example

Figure 4:
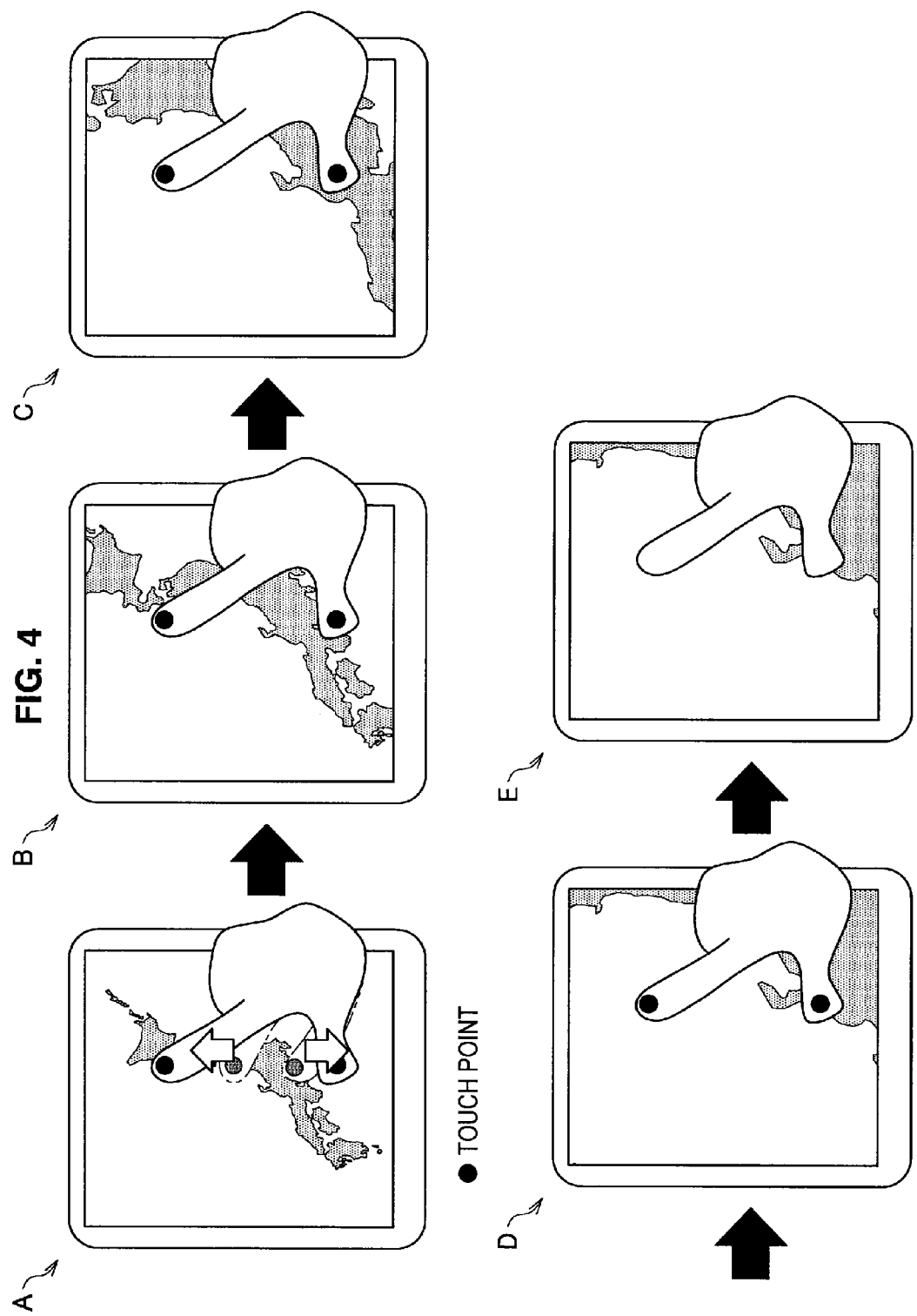
FIG. 4 is an explanatory diagram showing a first example of display control realized by a display control method according to the embodiment.

FIG. 4 is an explanatory diagram showing a first example of display control realized by the display control method according to the present embodiment. Here, similarly to FIG. 2, FIG. 4 shows a case in which a map (an example of display content) displayed on a display screen is enlarged by a pinch-out gesture.

When a pinch-out gesture is performed on the display screen (A shown in FIG. 4), the display control device 100 determines that a pinch-out gesture is performed, based on a change in detected operation positions, and enlarges the map according to the pinch-out gesture (B shown in FIG. 4). Also, in the case the user continues the pinch-out gesture, the display control device 100 increases the enlargement rate of the map according to the duration of the determination result determining that a pinch-out gesture is performed (C, D shown in FIG. 4).

Furthermore, the display control device 100 according to the present embodiment decides a display change speed, such as an increase speed of the enlargement rate or an increase speed of the reduction rate, based on a user operation, for example. As a decision method of the change speed, a method according to which the change speed is made to be in accordance with the operation speed at the time of a user performing an operation such as a pinch-out gesture, or a method of deciding the change speed according to the gap between operation positions as shown in FIG. 3 can be cited, for example.

Additionally, the decision method of the display change speed according to the present embodiment is not limited to the above. For example, the display control device 100 can also decide the display change speed (area change speed) by, for example, Formula 1 below, based on a difference between a current gap between two operation positions and a reference gap (for example, (B-A) shown in FIG. 3; hereinafter, sometimes referred to as a "pinch gap"). Here, V(t) in Formula 1 indicates the area change speed at time t, and α in Formula 1 is, for example, a proportionality constant proportionate to the pinch gap. The display control device 100 uniquely specifies a proportionality constant α that is in accordance with the pinch gap by using a function that is stored in advance to uniquely decide the proportionality constant α according to the pinch gap, for example $$V(t) = \alpha \times (\text{pinch gap}). \quad \text{(Formula 1)}$$

When the user stops the operation on the display screen, the display control device 100 determines a change from the first operation state to the second operation state based on the detection result of the operation positions. Then, after determining that change to the second operation state has taken place, the display control device 100 suspends enlargement of the map (E shown in FIG. 4).

As shown in FIG. 4, the user can cause the display control device 100 to perform desirable display without performing the pinch-out gesture several times.

(2) Second Example

Figure 5:
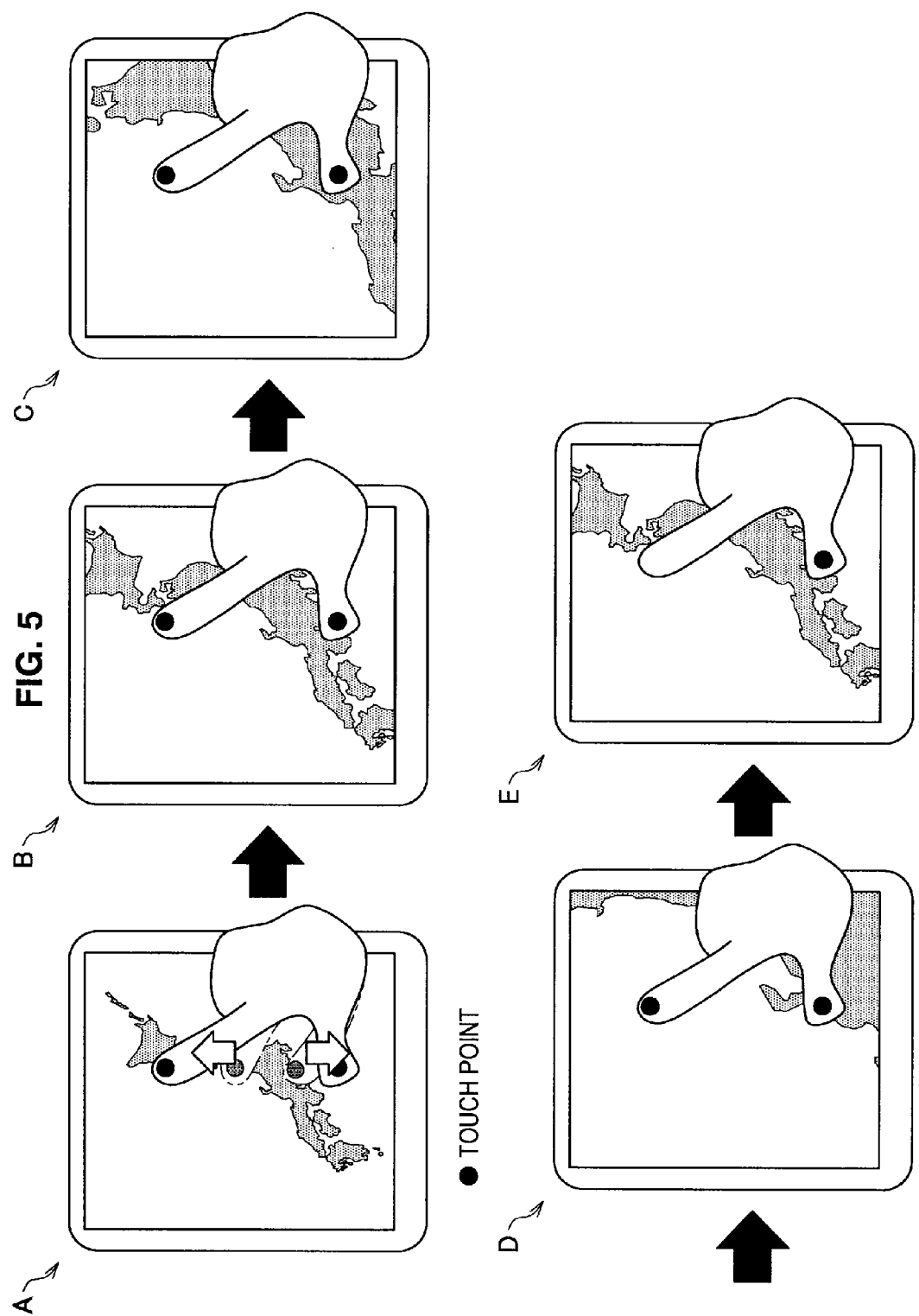
FIG. 5 is an explanatory diagram showing a second example of display control realized by the display control method according to the embodiment.

FIG. 5 is an explanatory diagram showing a second example of display control realized by the display control method according to the present embodiment. Here, similarly to FIG. 2, FIG. 5 shows a case in which a map (an example of display content) displayed on a display screen is enlarged by a pinch-out gesture. FIG. 5 also shows a case in which the display control device 100 stops enlarged display based on a user operation.

When a pinch-out gesture is performed on the display screen (A shown in FIG. 5), the display control device 100 determines that a pinch-out gesture is performed, based on a change in detected operation positions, and enlarges the map according to the pinch-out gesture (B shown in FIG. 5). Also, in the case the user continues the pinch-out gesture, the display control device 100 increases the enlargement rate of the map according to the duration of the determination result determining that a pinch-out gesture is performed (C, D shown in FIG. 5). Furthermore, if the user removes one of the fingers performing the pinch-out gesture from the display screen, the display control device 100 determines a change from the first operation state to the third operation state based on the detection result of the operation position. Then, after determining that change to the third operation state has taken place, the display control device 100 causes the display content before the execution of the process that is being performed to be the display content on the display screen. That is, the map displayed in an enlarged manner is changed to the map before enlargement (E shown in FIG. 5).

As shown in FIG. 5, the user can cause the display control device 100 to perform desirable display without performing the pinch-out gesture several times. Additionally, in FIG. 5, an example is shown where, in a case the user removes one of the fingers performing the pinch-out gesture from the display screen, the display control device 100 makes the display content before the execution of the process that is being performed to be the display content on the display screen, but the process of the display control device 100 according to the present embodiment is not limited to the above. For example, the display control device 100 may cause the display content before the execution of the process that is being performed to be the display content on the display screen in a case three or more operation positions are detected.

(3) Third Example

Figure 6:
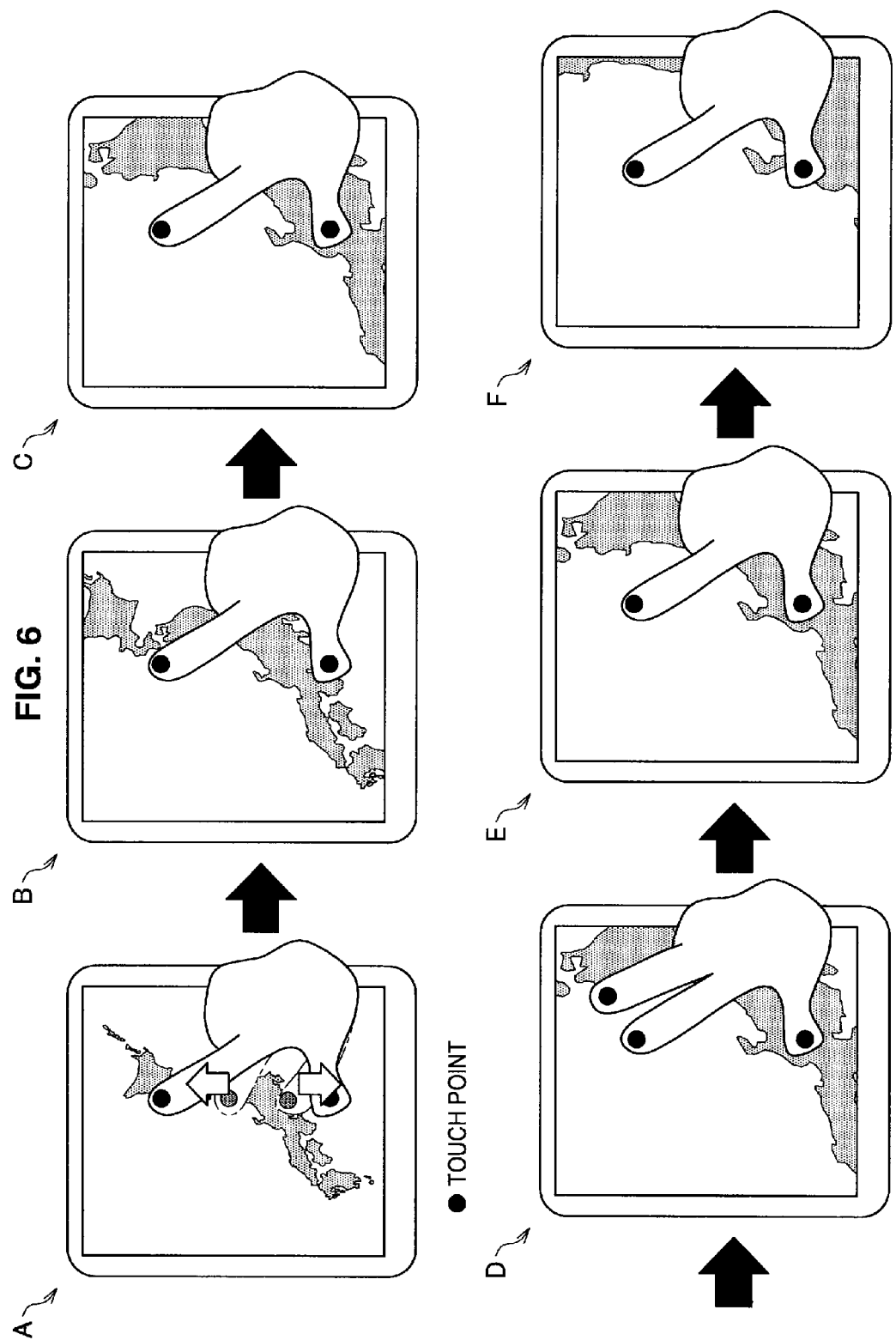
FIG. 6 is an explanatory diagram showing a third example of display control realized by the display control method according to the embodiment.

FIG. 6 is an explanatory diagram showing a third example of display control realized by the display control method according to the present embodiment. Here, similarly to FIG. 2, FIG. 6 shows a case in which a map (an example of display content) displayed on a display screen is enlarged by a pinch-out gesture. FIG. 6 also shows a case in which the display control device 100 temporarily stops (temporarily suspends) enlarged display based on a user operation.

When a pinch-out gesture is performed on the display screen (A shown in FIG. 6), the display control device 100 determines that a pinch-out gesture is performed, based on a change in detected operation positions, and enlarges the map according to the pinch-out gesture (B shown in FIG. 6). Also, in the case the user continues the pinch-out gesture, the display control device 100 increases the enlargement rate of the map according to the duration of the determination result determining that a pinch-out gesture is performed (C shown in FIG. 6). Furthermore, if the user further performs an operation on the display screen, in addition to the pinch-out gesture (if the operation positions increases to three or more), the display control device 100 determines a change from the first operation state to the third operation state based on the detection result of the operation positions. Then, after determining that change to the third operation state has taken place, the display control device 100 temporarily suspends the increase in the enlargement rate of the map, and temporarily stops the enlarged display (an example of process being performed) (D shown in FIG. 6).

Also, when the user stops the operation that he/she has further performed on the display screen, the display control device 100 determines a change from the third operation state to the first operation state based on the detection result of the operation positions. Then, after determining that change to the first operation state has taken place, the display control device 100 restarts the execution of the process that was temporarily stopped, that is, enlargement of the map (E, F shown in FIG. 6).

As shown in FIG. 6, the user can cause the display control device 100 to perform desirable display without performing the pinch-out gesture several times. Additionally, in FIG. 6, an example is given according to which the display control device 100 temporarily stops the process that is being performed in a case the user further performs an operation on the display screen, in addition to the pinch-out gesture, but the process of the display control device 100 according to the present embodiment is not limited to the above. For example, the display control device 100 may temporarily stop the process that is being performed in a case the user removes one of the fingers performing the pinch-out gesture from the display screen, that is, in a case one operation position is detected.

The first to third examples of display control according to the present embodiment described above are examples where the display control device 100 determines a process to be performed according to a change in the operation position(s) and performs the process which has been determined. However, the display control according to the present embodiment is not limited to performing, by the display control device 100, immediately after determining a process to be performed, the process which has been determined. For example, the display control device 100 according to the present embodiment may present, to the user, a process result candidate indicating a process result which will be obtained if a process that is determined is performed, while maintaining the display content that is currently displayed, and may switch, in a case the process result candidate is selected by the user, the display content that is currently displayed to display corresponding to the selected process result candidate.

Here, as a presentation method of a process result candidate according to the present embodiment, a visual presentation method of displaying the process result candidate within a pop-up window that is displayed within the display screen may be cited, for example. Also, as the process result candidate according to the present embodiment, a process result which will be obtained when a process that is determined is performed (for example, display content displayed in an enlarged or reduced manner), and text information indicating the content of the process result may be cited. Additionally, the presentation method of the process result candidate according to the present embodiment is not limited to the visual presentation method. For example, the display control device 100 according to the present embodiment is also capable of auditorily presenting a process result candidate by performing notification regarding the content of a process result candidate by sound, for example.

(4) Fourth Example

Figure 7:
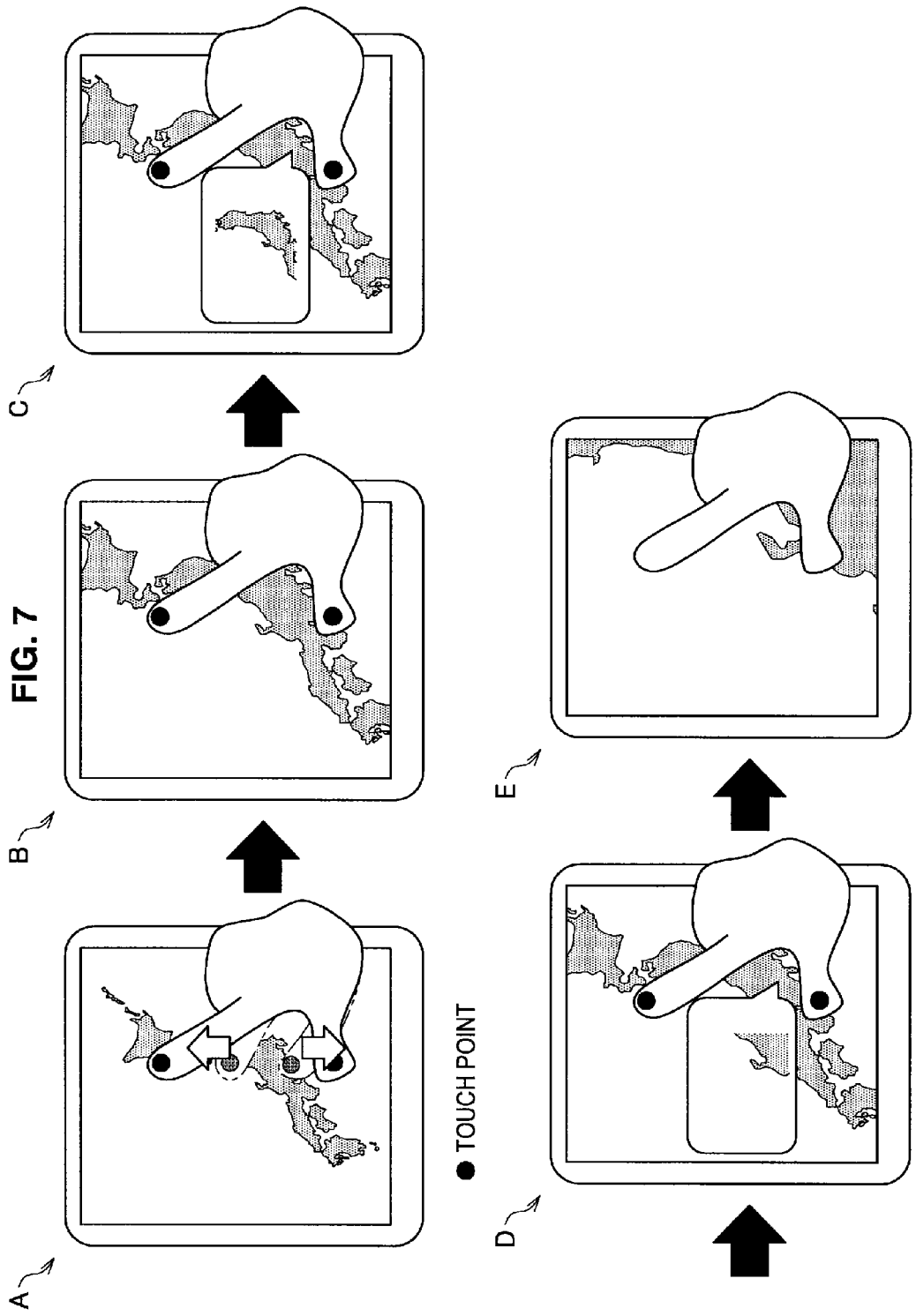
FIG. 7 is an explanatory diagram showing a fourth example of display control realized by the display control method according to the embodiment.

FIG. 7 is an explanatory diagram showing a fourth example of display control realized by the display control method according to the present embodiment. Here, similarly to FIG. 2, FIG. 7 shows a case in which a map (an example of display content) displayed on a display screen is enlarged by a pinch-out gesture. FIG. 7 also shows a case in which the display control device 100 displays a process result candidate in a pop-up window.

When a pinch-out gesture is performed on the display screen (A shown in FIG. 7), the display control device 100 determines that a pinch-out gesture is performed, based on a change in detected operation positions. Then, the display control device 100 enlarges the map according to the pinch-out gesture (B shown in FIG. 7). Also, in the case the user continues the pinch-out gesture, the display control device 100 displays a pop-up window within the display screen, and displays as the process result candidate, in the pop-up window, an enlarged map that is a result which will be obtained by increasing the enlargement rate according to the duration of the determination result determining that a pinch-out gesture is performed (C shown in FIG. 7).

Additionally, FIG. 7 shows, as in B of FIG. 7, an example where the map is enlarged according to the pinch-out gesture, but the process of the display control device 100 according to the present embodiment is not limited to the above. For example, in a case it is determined that a pinch-out gesture is performed, the display control device 100 may display a pop-up window as shown in C of FIG. 7, instead of enlarging the map as shown in B of FIG. 7.

Furthermore, in a case the user continues the pinch-out gesture, the display control device 100 increases the enlargement rate of the map (an example of the process result candidate) displayed in the pop-up window, according to the duration of the determination result determining that a pinch-out gesture is performed (D shown in FIG. 7). Furthermore, when the user stops the operation on the display screen, the display control device 100 determines a change from the first operation state to the second operation state based on the detection result of the operation position. Then, after determining that change to the second operation state has taken place, the display control device 100 causes the map (an example of the process result candidate) displayed in the pop-up window to be the display content of the display screen (E shown in FIG. 7).

Also in the case as shown in FIG. 7 where a process result candidate is presented, the user can cause the display control device 100 to perform desirable display without performing the pinch-out gesture several times.

Furthermore, as shown in FIG. 7, for example, by displaying the content of a process result candidate in a pop-up window, the display control device 100 can allow the user to check the result of performing a process, while maintaining the current display content. According to a display control device of related art, one way to allow the user to check the result of performing a process, while maintaining the current display content, is to make it a function separate from the function of performing a process by a pinch-in gesture or a pinch-out gesture, for example. However, in the case of making it a separate function as described above, to "change display content after performing temporal enlargement/reduction and allowing a user to check the display screen," as shown in FIG. 7, for example, becomes difficult to realize. Therefore, displaying content of a process result candidate in a pop-up window, as shown in FIG. 7, for example, can increase the convenience of the user compared to when a display control device of related art is used.

(5) Fifth Example

Figure 8:
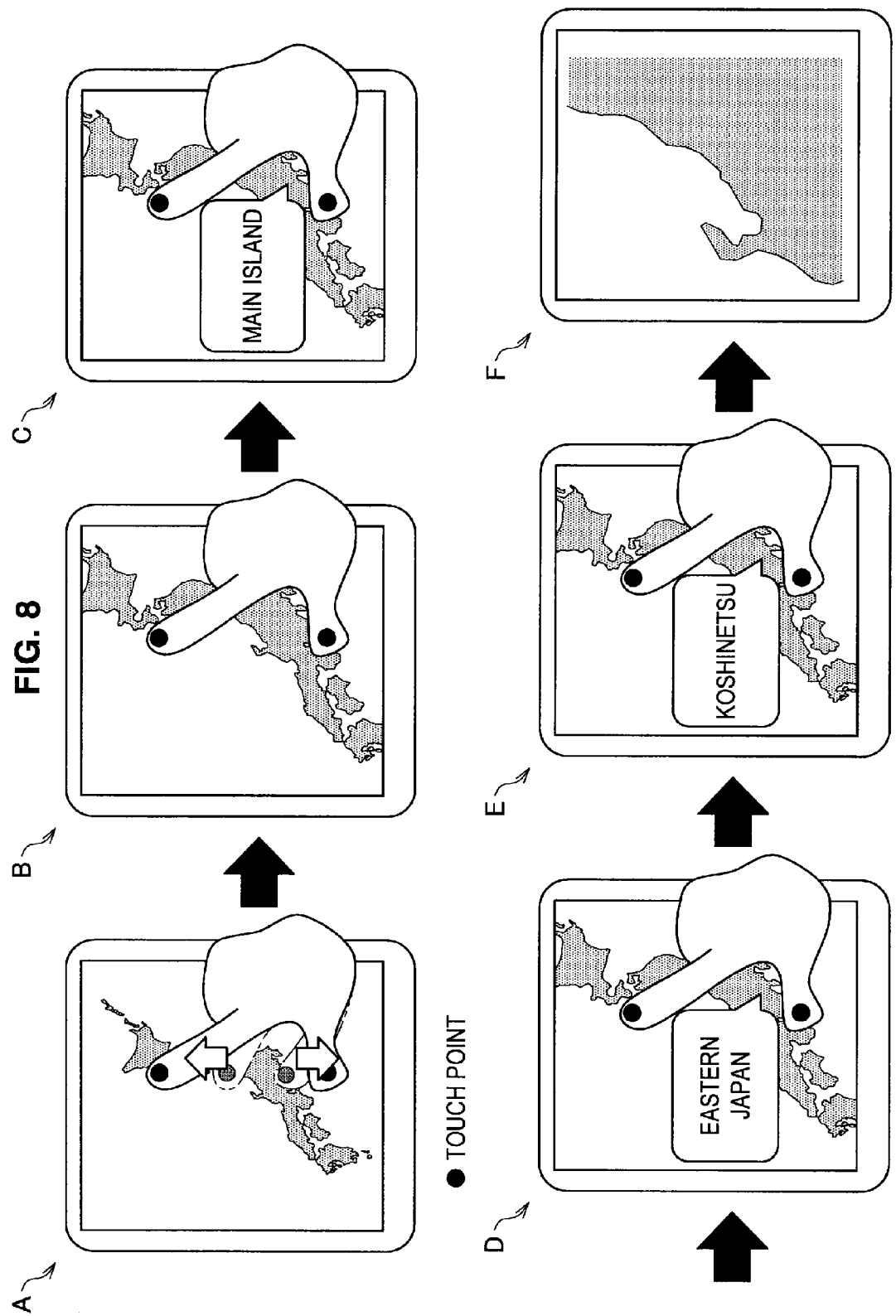
FIG. 8 is an explanatory diagram showing a fifth example of display control realized by the display control method according to the embodiment.

FIG. 8 is an explanatory diagram showing a fifth example of display control realized by the display control method according to the present embodiment. Here, similarly to FIG. 2, FIG. 8 shows a case in which a map (an example of display content) displayed on a display screen is enlarged by a pinch-out gesture. Also, similarly to FIG. 7, FIG. 8 shows a case in which the display control device 100 displays a process result candidate in a pop-up window.

When a pinch-out gesture is performed on the display screen (A shown in FIG. 8), the display control device 100 determines that a pinch-out gesture is performed, based on a change in detected operation positions. Then, the display control device 100 enlarges the map according to the pinch-out gesture (B shown in FIG. 8). Additionally, FIG. 8 shows, as in B of FIG. 8, an example where a map is enlarged according to a pinch-out gesture, but the process of the display control device 100 according to the present embodiment is not limited to the above. For example, in a case where it is determined that a pinch-out gesture is performed, the display control device 100 may display a pop-up window as in C shown in FIG. 8 without enlarging the map as in B shown in FIG. 8.

Also, in the case the user continues the pinch-out gesture, the display control device 100 displays a pop-up window in the display screen, and displays a process result candidate in the pop-up window (C, D, E shown in FIG. 8). FIG. 8 shows an example where, instead of a map that is enlarged according to the duration of determination as shown in C of FIG. 7, for example, text information corresponding to the enlarged map is displayed as the process result candidate.

Here, the display control device 100 displays, in the pop-up window, text information related to the display content displayed on the display screen and to an enlargement rate corresponding to the duration of determination that is based on a pinch-out gesture, by using a look-up table, for each piece of display content displayed on the display screen, in which text information to be a process result candidate and an enlargement rate are associated, for example. Additionally, it is needless to say that display method of text information in the pop-up window is not limited to the above.

Furthermore, when the user stops the operation on the display screen, the display control device 100 determines a change from the first operation state to the second operation state based on the detection result of operation position. After determining that change to the second operation state has taken place, the display control device 100 causes a map of Koshinetsu region corresponding to the text information "Koshinetsu" displayed in the pop-up window to be the display content of the display screen (F shown in FIG. 8).

Here, the display control device 100 displays, on the display screen, display content corresponding to the text information (process result candidate) displayed in the pop-up window by using a look-up table in which text information to be a process result candidate and display content are associated, for example. By, for example, associating text information to be a process result candidate and display content in advance, as described above, the display control device 100 can display, on the display screen, display content with higher visibility. Display content with higher visibility here can be achieved by displaying a map corresponding to "Koshinetsu" region (an example of text information), which has been selected, in the centre of the display screen, as shown in F of FIG. 8. In this manner, the display control device 100 can further increase the convenience of the user by, for example, associating in advance text information to be a process result candidate and display content, as described above. Additionally, it is needless to say that the display method, of the display control device 100 according to the present embodiment, of display content corresponding to text information (process result candidate) displayed in the pop-up window is not limited to the above.

Also in the case where a process result candidate is presented as shown in FIG. 8, the user can cause the display control device 100 to perform desirable display without performing the pinch-out gesture several times.

Furthermore, as shown in FIG. 8, for example, by displaying text information corresponding to a process result in the pop-up window as the process result candidate, the display control device 100 can allow the user to check the result of performing a process, while maintaining the current display content, as with the fourth example described above. Therefore, displaying text information corresponding to a process result in a pop-up window as a process result candidate, as shown in FIG. 8, for example, can increase the convenience of the user compared to when a display control device of related art is used.

Furthermore, when the size of the display screen is small, for example, the user may not sufficiently recognize the process result candidate even if a map (content of a process result) as shown in C or D of FIG. 7 is displayed in the pop-up window. Even if the size of the display screen is small, as in the above case, by displaying text information corresponding to a process result in the pop-up window as a process result candidate, as shown in FIG. 8, for example, easier recognition of the process result candidate is enabled.

(6) Sixth Example

Figure 9:
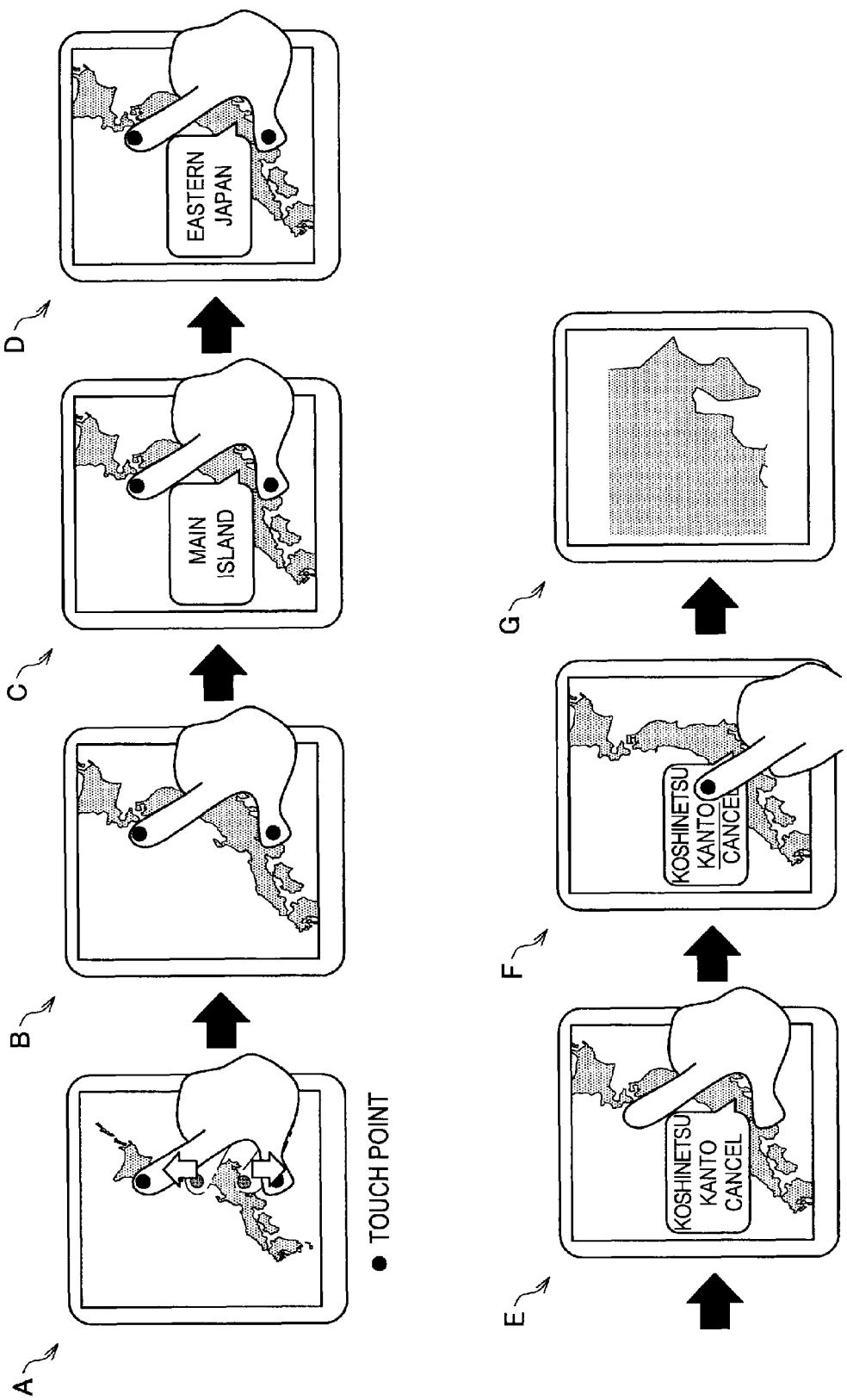
FIG. 9 is an explanatory diagram showing a sixth example of display control realized by display control method according to the embodiment.

FIG. 9 is an explanatory diagram showing a sixth example of display control realized by the display control method according to the present embodiment. Here, similarly to FIG. 2, FIG. 9 shows a case in which a map (an example of display content) displayed on a display screen is enlarged by a pinch-out gesture. Also, similarly to FIG. 8, FIG. 9 shows a case where a process result candidate represented by text information is displayed in a pop-up window.

When a pinch-out gesture is performed on the display screen (A shown in FIG. 9), the display control device 100 determines that a pinch-out gesture is performed, based on the change in the detected operation positions. Then, the display control device 100 enlarges the map according to the pinch-out gesture (B shown in FIG. 9). Additionally, FIG. 9 shows, as in B of FIG. 9, an example where the map is enlarged according to the pinch-out gesture, but the process of the display control device 100 according to the present embodiment is not limited to the above. For example, in a case it is determined that a pinch-out gesture is performed, the display control device 100 may display a pop-up window as shown in C of FIG. 9 instead of enlarging the map as shown in B of FIG. 9.

Also, in the case the user continues the pinch-out gesture, the display control device 100 displays a pop-up window in the display screen, and displays text information (an example of process result candidate) in the pop-up window (C, D shown in FIG. 9).

When the user stops the operation on the display screen, the display control device 100 determines a change from the first operation state to the second operation state based on the detection result of the operation position. Then, after determining that change to the second operation state has taken place, the display control device 100 menu-displays, in a pop-up window, a process result candidate corresponding to the enlargement rate at the time point of determination.

Here, the display control device 100 realizes menu display as shown in E of FIG. 9 by using a look-up table, for each piece of display content displayed on the display screen, in which text information to be a process result candidate and an enlargement rate are associated, for example. The display control device 100 may also include in the menu an option for stopping execution of a process, such as "cancel" in E of FIG. 9, for example. Additionally, it is needless to say that the method, of the display control device 100 according to the present embodiment, of displaying a menu in a pop-up window is not limited to the above.

When an option in the pop-up window is selected by the user (F shown in FIG. 9), the display control device 100 causes a map of Kanto region corresponding to the option "Kanto" which has been selected to be the display content of the display screen (G shown in FIG. 9).

Also in the case as shown in FIG. 9 where a process result candidate is presented, the user can cause the display control device 100 to perform desirable display without performing the pinch-out gesture several times.

Furthermore, as shown in FIG. 9, for example, by displaying a menu display, in the pop-up window, in which one or more pieces of text information corresponding to process result(s) are displayed as the process result candidate(s), the display control device 100 can allow the user to check the result of performing a process, while maintaining the current display content, as with the fourth example described above.

Therefore, displaying a menu display, in the pop-up window, in which one or more pieces of text information corresponding to process result(s) are displayed as the process result candidate(s), as shown in FIG. 9, for example, can increase the convenience of the user compared to when a display control device of related art is used.

Furthermore, when the size of the display screen is small, for example, by displaying a menu display, in the pop-up window, in which one or more pieces of text information corresponding to process result(s) are displayed as the process result candidate(s), as shown in FIG. 9, for example, easier recognition of the process result candidate is enabled, as with the fifth example described above.

Furthermore, as shown in FIG. 9, for example, by displaying a menu display, in the pop-up window, in which one or more pieces of text information corresponding to process result(s) are displayed as the process result candidate(s), the user is enabled to switch the display more flexibly. Therefore, by displaying a menu display, in the pop-up window, in which one or more pieces of text information corresponding to process result(s) are displayed as the process result candidate(s), as shown in FIG. 9, for example, the display control device 100 can further increase the convenience of the user.

The first to sixth examples of display control according to the present embodiment described above show examples where the size of display content displayed on the display screen is changed according to the change in operation position(s). However, display control according to the present embodiment is not limited to changing, by the display control device 100, the size of display content displayed on the display screen according to the change in operation position(s). For example, in a case a display screen on which a list of images arranged on a time axis is displayed is displayed, the display control device 100 according to the present embodiment can enlarge or reduce the time axis according to the change in the operation position.

Figure 10:
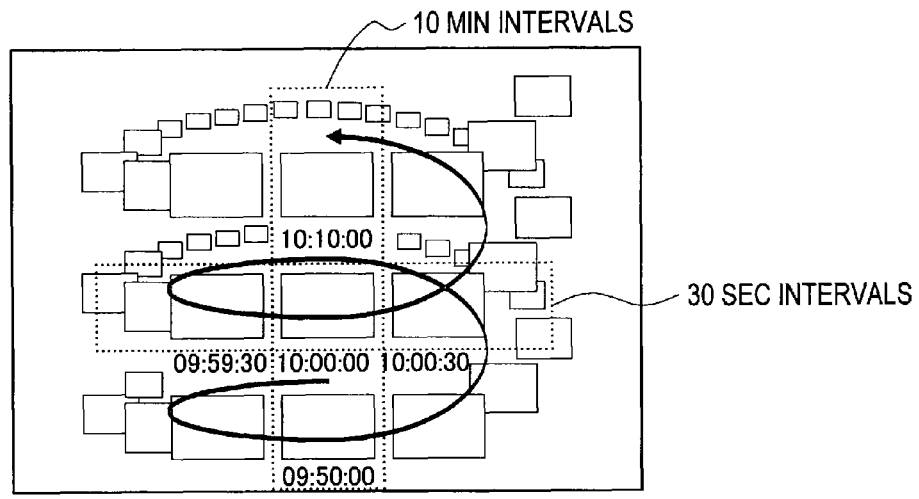
FIG. 10 is an explanatory diagram showing an example of a display screen according to the embodiment on which a list of images arranged on a time axis is displayed.

FIG. 10 is an explanatory diagram showing an example of a display screen according to the present embodiment on which a list of images arranged on a time axis is displayed. FIG. 10 shows a thumbnail screen on which still images captured by an imaging device such as a camera at certain intervals are arranged on a time axis according to the time of shooting. Here, FIG. 10 shows an example where the interval of the time of shooting is 30 seconds for horizontally arranged still images and the interval of the time of shooting is 10 minutes for vertically arranged still images, but the thumbnail screen, according to the present embodiment, in which a list of images arranged on a time axis is displayed is not limited to the above. Also, images to be displayed in the thumbnail screen as shown in FIG. 10, for example, are not limited to still images captured at certain intervals by an imaging device. For example, the thumbnail screen shown in FIG. 10 may have frames extracted from a video at certain intervals arranged on a time axis.

Furthermore, FIG. 10 shows a display screen in which the time axis is shown in a spiral manner. Here, by displaying a display screen in which the time axis is shown in a spiral manner, the following effects can be achieved, for example.

A user can more intuitively grasp the temporal relationship between displayed images (contents) than when the time axis is shown in a linear manner, for example.

The number of images to be arranged in the display screen can be increased than when the time axis is shown in a linear manner, for example.

Periodicity can be expressed as the temporal relationship between displayed images.

Using the temporal periodicity, both a search method based on images that are adjacent to each other with respect to time (row of thumbnails (horizontal)) and a search method based on images that are adjacent to each other with respect to periodicity (column of thumbnails (vertical)) can be provided to a user, for example.

By using the effects as described above, application to a search application for images (still images/video images) becomes possible, for example.

With the display control device 100 performing a process corresponding to a repetitive operation (described later), intuitive operability which brings a spring, for example, to mind can be provided to a user.

In the following, an explanation will be given taking, as an example of a display screen on which a list of images arranged on a time axis is displayed, a display screen, as shown in FIG. 10, on which the time axis is shown in a spiral manner. Additionally, the display screen, according to the present embodiment, on which a list of images arranged on a time axis is displayed is not limited to the display screen on which the time axis is shown in a spiral manner. For example, as the display screen, according to the present embodiment, on which a list of images arranged on a time axis is displayed, many display screens, such as a display screen on which the time axis is shown in a linear manner, a curved manner, or a zigzag manner, may be cited.

Also, in the following, an explanation will be given mainly taking, as an example, a case where the display control device 100 performs a process of enlarging the time axis according to a user's pinch-out gesture. Additionally, in the following, although its explanation will be omitted, the display control device 100 can also perform a process of reducing the time axis according to a user's pinch-in operation in the same manner as the process of enlarging the time axis according to a user's pinch-out gesture described below, for example. Also, the display control device 100 is not limited to performing the process according to the pinch-out gesture or the pinch-in gesture. For example, the display control device 100 can also determine a repetitive operation of a user, and perform a process that is in accordance with the detected repetitive operation.

For example, the display control device 100 determines a repetitive operation based on whether the value of a product of an area change speed at time t (area change speed currently calculated) and an area change speed at time t−1 (area change speed previously calculated) is a negative value or not. More specifically, the display control device 100 determines that a repetitive operation was performed when the value of the product is a negative value.

Figure 11:
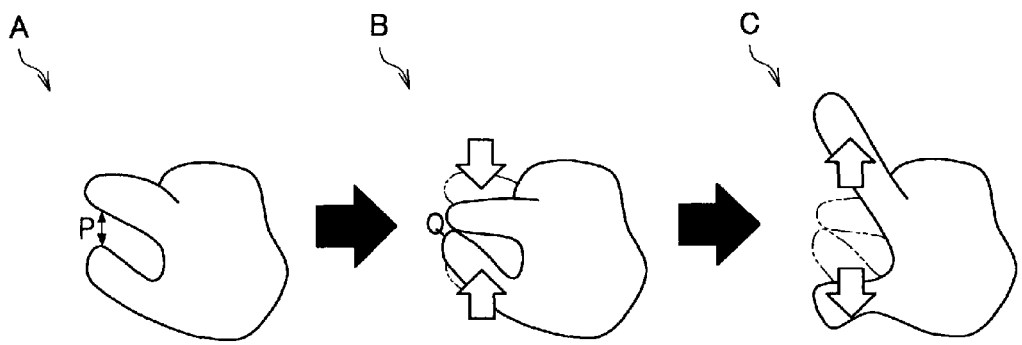
FIG. 11 is an explanatory diagram for describing an example of a decision method, of the display control device according to the present embodiment, of a display change speed, which is dependent on a process corresponding to a repetitive operation.
Figure 12:
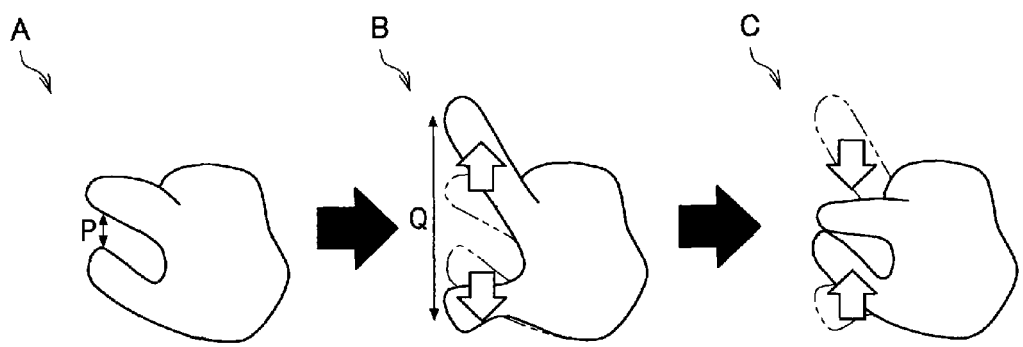
FIG. 12 is an explanatory diagram for describing an example of the decision method, of the display control device according to the present embodiment, of a display change speed, which is dependent on a process corresponding to a repetitive operation.

The display control device 100 can also decide a display change speed, which is dependent on a process corresponding to a repetitive operation, based on a reference gap and a pinch gap, for example. FIGS. 11 and 12 are explanatory diagrams for describing examples of a decision method of a display change speed, which is dependent on a process corresponding to a repetitive operation.

The display control device 100 decides the display change speed (hereinafter, "repetition rate"), which is dependent on a process corresponding to a repetitive operation, based on a reference gap P shown in A of FIG. 11 and of FIG. 12 and a pinch gap Q shown in B of FIG. 11 and of FIG. 12. More specifically, if, for example, a reference gap P is smaller than (or equal to or smaller than) the pinch gap Q, the display control device 100 takes the enlargement rate as the repetition rate. Also, if, for example, the reference gap P is larger than (or equal to or larger than) the pinch gap Q, the display control device 100 takes the reduction rate as the repetition rate.

Additionally, it is needless to say the decision method according to the present embodiment of the display change speed, which is dependent on a process corresponding to a repetitive operation, is not limited to the above.

(7) Seventh Example

Figure 13:
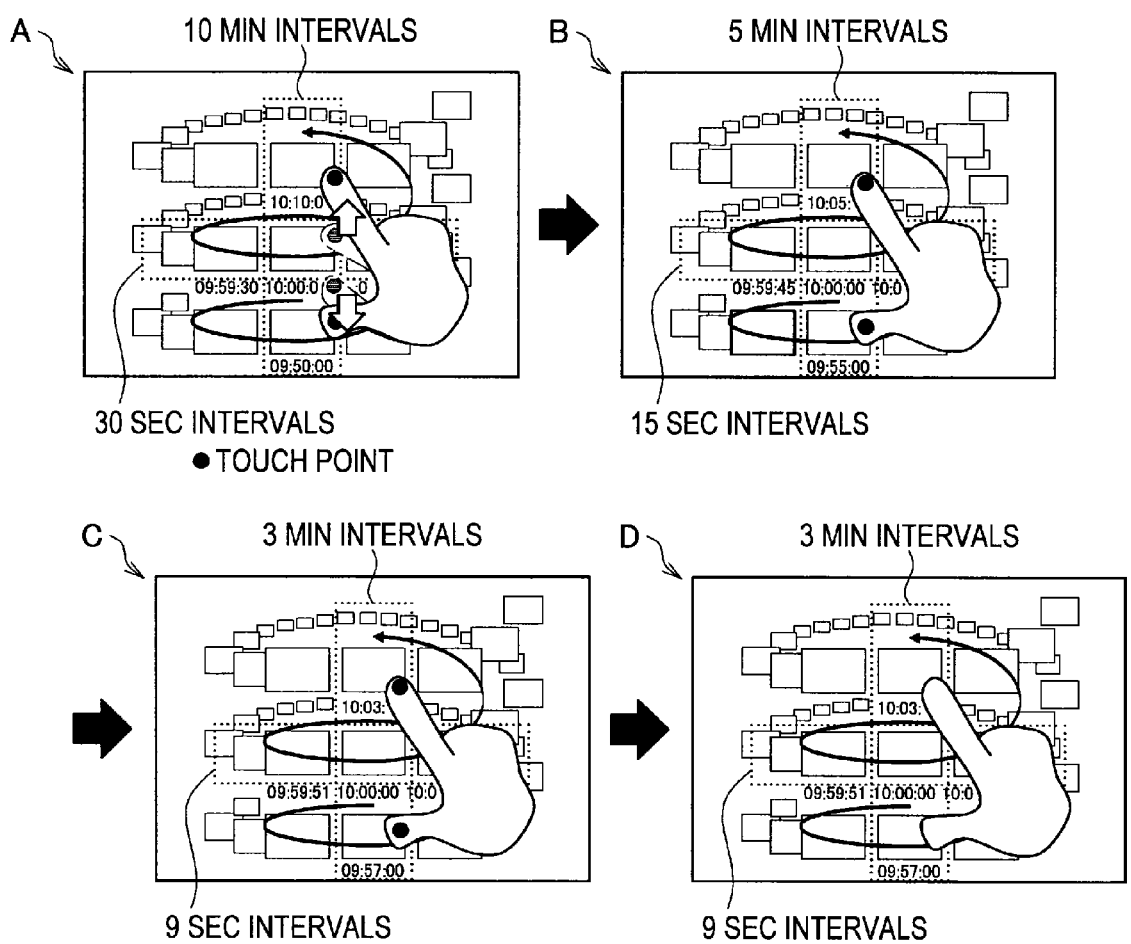
FIG. 13 is an explanatory diagram showing a seventh example of display control realized by the display control method according to the embodiment.

FIG. 13 is an explanatory diagram showing a seventh example of display control realized by the display control method according to the present embodiment.

When a pinch-out gesture is performed on the display screen (A shown in FIG. 13), the display control device 100 determines that a pinch-out gesture is performed, based on a change in operation positions, and enlarges a time axis according to the pinch-out gesture (B shown in FIG. 13). Also, in the case the user continues the pinch-out gesture, the display control device 100 increases the enlargement rate of the time axis according to the duration of the determination result determining that a pinch-out gesture is performed (C shown in FIG. 13).

When the user stops the operation on the display screen, the display control device 100 determines a change from the first operation state to the second operation state based on the detection result of the operation position(s). Then, after determining that change to the second operation state has taken place, the display control device 100 suspends enlargement of the time axis (D shown in FIG. 13).

As shown in FIG. 13, the user can cause the display control device 100 to perform desirable display without performing the pinch-out gesture several times.

(8) Eighth Example

Figure 14:
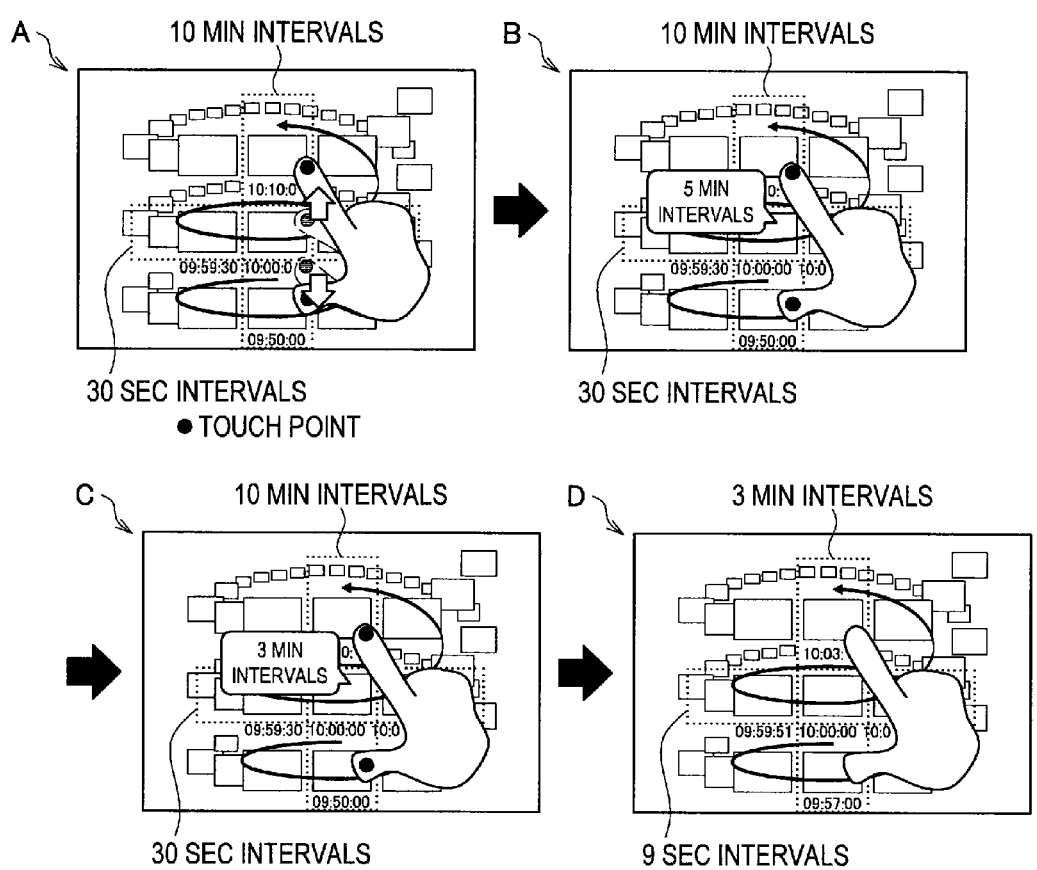
FIG. 14 is an explanatory diagram showing an eighth example of display control realized by the display control method according to the embodiment.
Figure 15:
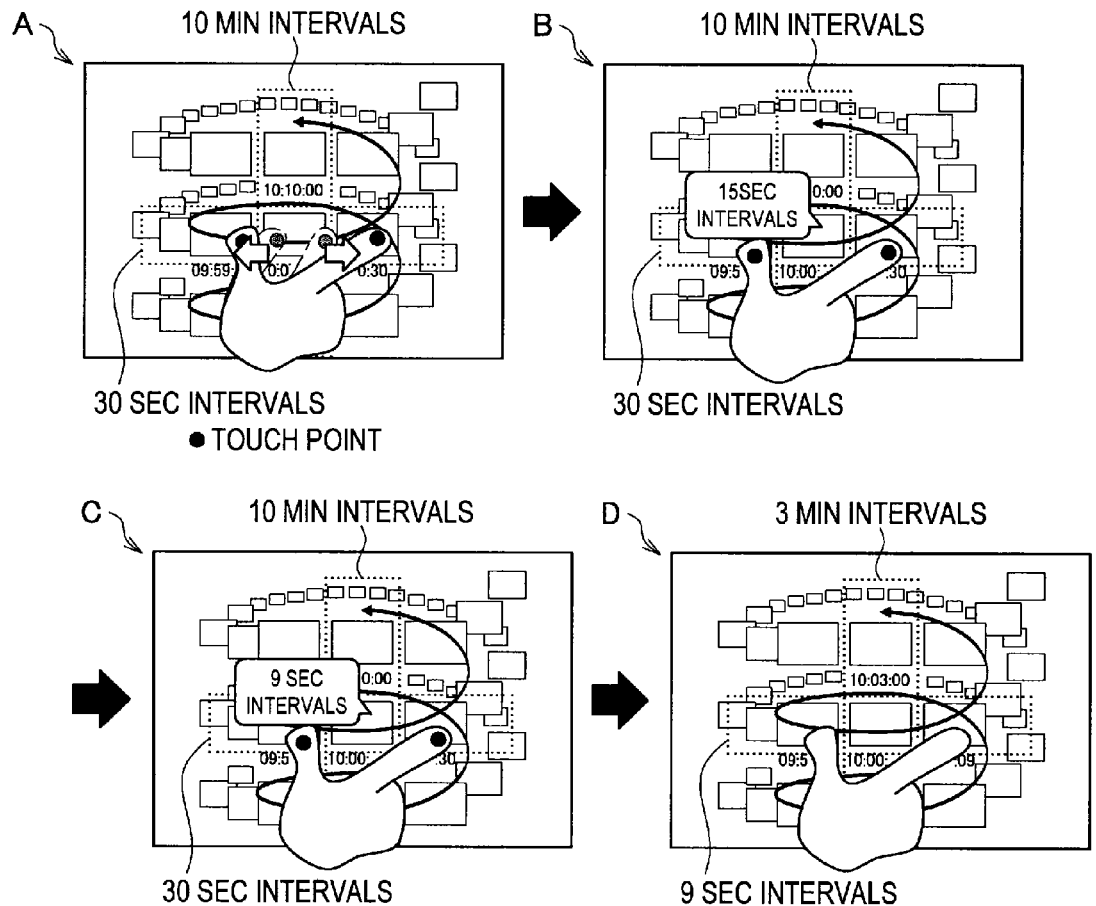
FIG. 15 is an explanatory diagram showing the eighth example of display control realized by the display control method according to the embodiment.

FIGS. 14 and 15 are explanatory diagrams showing an eighth example of display control realized by the display control method according to the present embodiment. Here, FIGS. 14 and 15 show cases where a process result candidate is displayed in a pop-up window, as in the fifth example above. Additionally, although examples are shown in FIGS. 14 and 15 where text information is displayed as the process result candidate, it is needless to say that the display control device 100 can also display, as in the fourth example above, display content itself as the process result candidate. Furthermore, FIGS. 14 and 15 show examples where the display control device 100 switches between enlargement of a time axis for images that are adjacent to each other with respect to time (row of thumbnails) and enlargement of a time axis for images that are adjacent to each other with respect to periodicity (column of thumbnails). To be specific, FIG. 14 shows an example of an enlargement process of a time axis for images that are adjacent to each other with respect to periodicity (column of thumbnails), and FIG. 15 shows an example of an enlargement process of a time axis for images that are adjacent to each other with respect to time (row of thumbnails).

Figure 16:
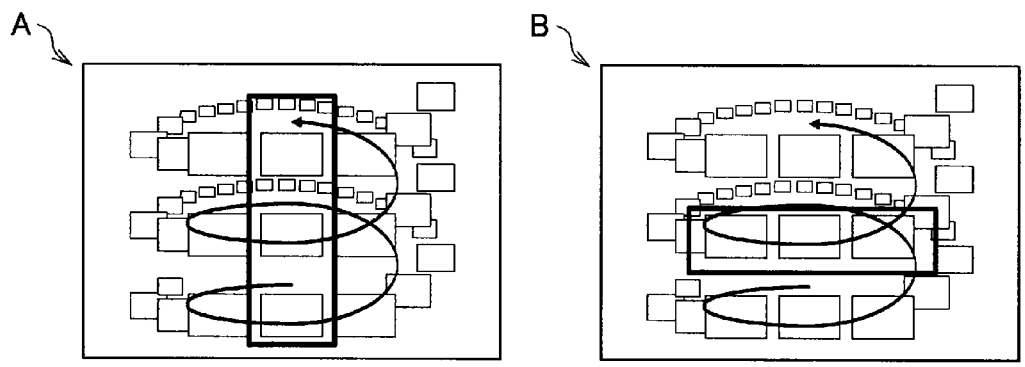
FIG. 16 is an explanatory diagram for describing an example of a switching method, of the display control device according to the present embodiment, of a process on a time axis.
Figure 17:
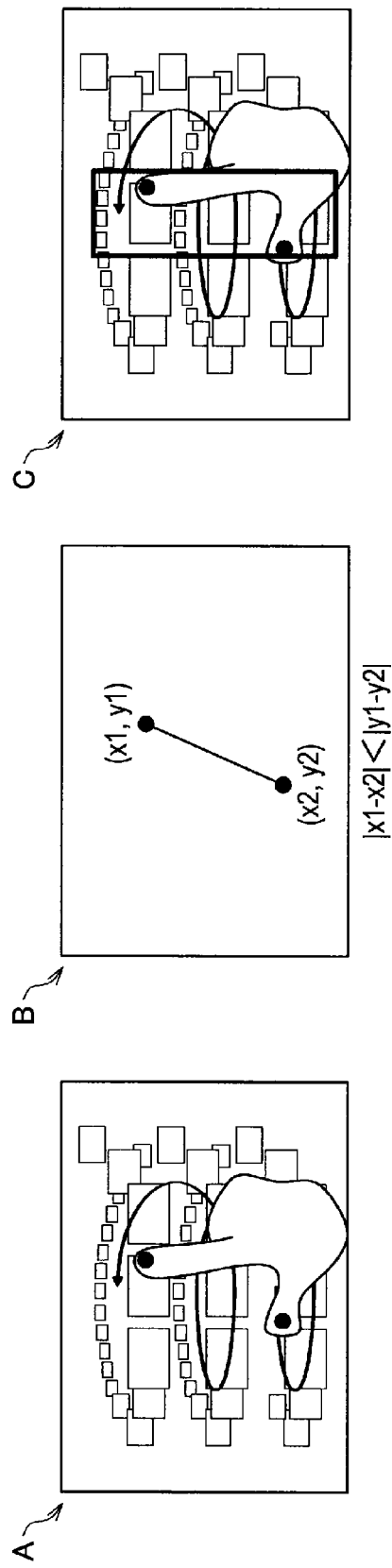
FIG. 17 is an explanatory diagram for describing an example of a switching method, of the display control device according to the present embodiment, of a process on a time axis.
Figure 18:
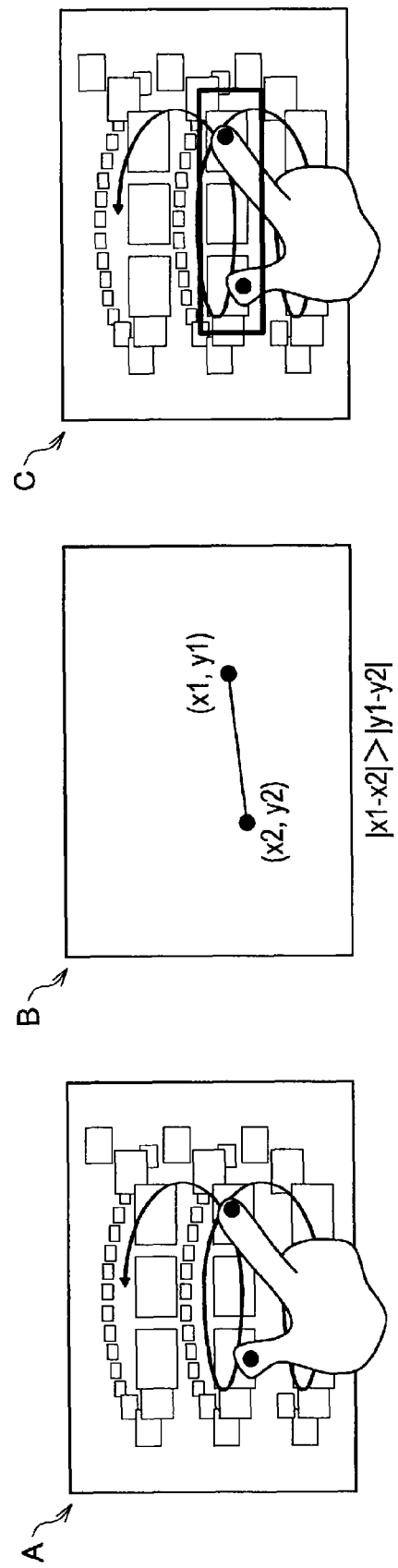
FIG. 18 is an explanatory diagram for describing an example of a switching method, of the display control device according to the present embodiment, of a process on a time axis.

Here, an example of a switching method, of the display control device 100 according to the present embodiment, of a process on a time axis will be described. FIGS. 16 to 18 are explanatory diagrams for describing examples of a switching method, of the display control device 100 according to the present embodiment, of a process on a time axis.

The display control device 100 compares an absolute value of a difference between two operation positions in the x-axis direction and an absolute value of a difference in the y-axis, and thereby determines whether a process is a process on the time axis for images that are adjacent to each other with respect to periodicity (column of thumbnails) shown in A of FIG. 16 or a process on the time axis for images that are adjacent to each other with respect to time (row of thumbnails) shown in B of FIG. 16. For example, in a case the absolute value of the difference in the x-axis direction after a pinch-out gesture is smaller than (or equal to or smaller than) the absolute value of the difference in the y-axis after the pinch-out gesture, as shown in B of FIG. 17, the display control device 100 determines that it is a process on the time axis for images that are adjacent to each other with respect to periodicity (column of thumbnails). Also, for example, in a case the absolute value of the difference in the x-axis direction after a pinch-out gesture is greater than (or equal to or greater than) the absolute value of the difference in the y-axis direction after the pinch-out gesture, as shown in B of FIG. 18, the display control device 100 determines that it is a process on the time axis for images that are adjacent to each other with respect to time (row of thumbnails).

The display control device 100 switches the process on a time axis based on the result of determination as described above, for example. Additionally, the switching method of a process on a time axis of the display control device 100 according to the present embodiment is not limited to the above. For example, the display control device 100 can also calculate an angle between a straight line passing through two operation positions and the x-axis (a horizontal axis in the display screen), and switch the process on a time axis based on a range to which the calculated angle belongs.

Referring back to FIGS. 14 and 15, the eighth example of display control according to the present embodiment will be described. When a pinch-out gesture is performed on the display screen (A shown in FIG. 14 and FIG. 15), the display control device 100 determines that a pinch-out gesture is performed, based on a change in detected operation positions. Also, the display control device 100 determines a process on a time axis based on the operation positions after the pinch-out gesture, by comparing the absolute value of the difference between the two operation positions in the x-axis direction and the absolute value of the difference in the y-axis direction, for example.

Furthermore, in the case the user continues the pinch-out gesture, the display control device 100 displays a pop-up window on the display screen, and displays a process result candidate in the pop-up window (B, C shown in FIG. 14 and FIG. 15). FIGS. 14 and 15 show examples where text information is displayed as the process result candidate, as in FIG. 8. Here, the display control device 100 displays, in the pop-up window, text information corresponding to an enlargement rate that is according to the duration of determination for the pinch-out gesture, by using a look-up table in which text information to be a process result candidate and an enlargement rate are associated, for example. Additionally, it is needless to say that the display method, of the display control device 100 according to the present embodiment, of text information in the pop-up window is not limited to the above.

When the user stops the operation on the display screen, the display control device 100 determines a change from the first operation state to the second operation state, based on the detection position of the operation position. After determining that change to the second operation state has taken place, the display control device 100 changes the display content of the display screen to correspond to a time axis corresponding to text information "3 min intervals" or "9 sec intervals" displayed in the pop-up window (D shown in FIG. 14 and FIG. 15). Here, the display control device 100 displays, on the display screen, display content corresponding to text information (process result candidate) displayed in the pop-up window, by using a look-up table in which text information to be a process result candidate and display content are associated, for example. Additionally, it is needless to say that the display method, of the display control device 100 according to the present embodiment, of display content corresponding to text information (process result candidate) displayed in the pop-up window is not limited to the above.

Also in the cases as shown in FIGS. 14 and 15 where process result candidates are presented, the user can cause the display control device 100 to perform desirable display without performing the pinch-out gesture several times.

Furthermore, as shown in FIGS. 14 and 15, for example, by displaying in the pop-up window text information corresponding to a process result as a process result candidate, the display control device 100 can, as in the fifth example above, increase the convenience of the user compared to when a display control device of related art is used and enable easier recognition of the process result candidate.

(9) Ninth Example

Figure 19:
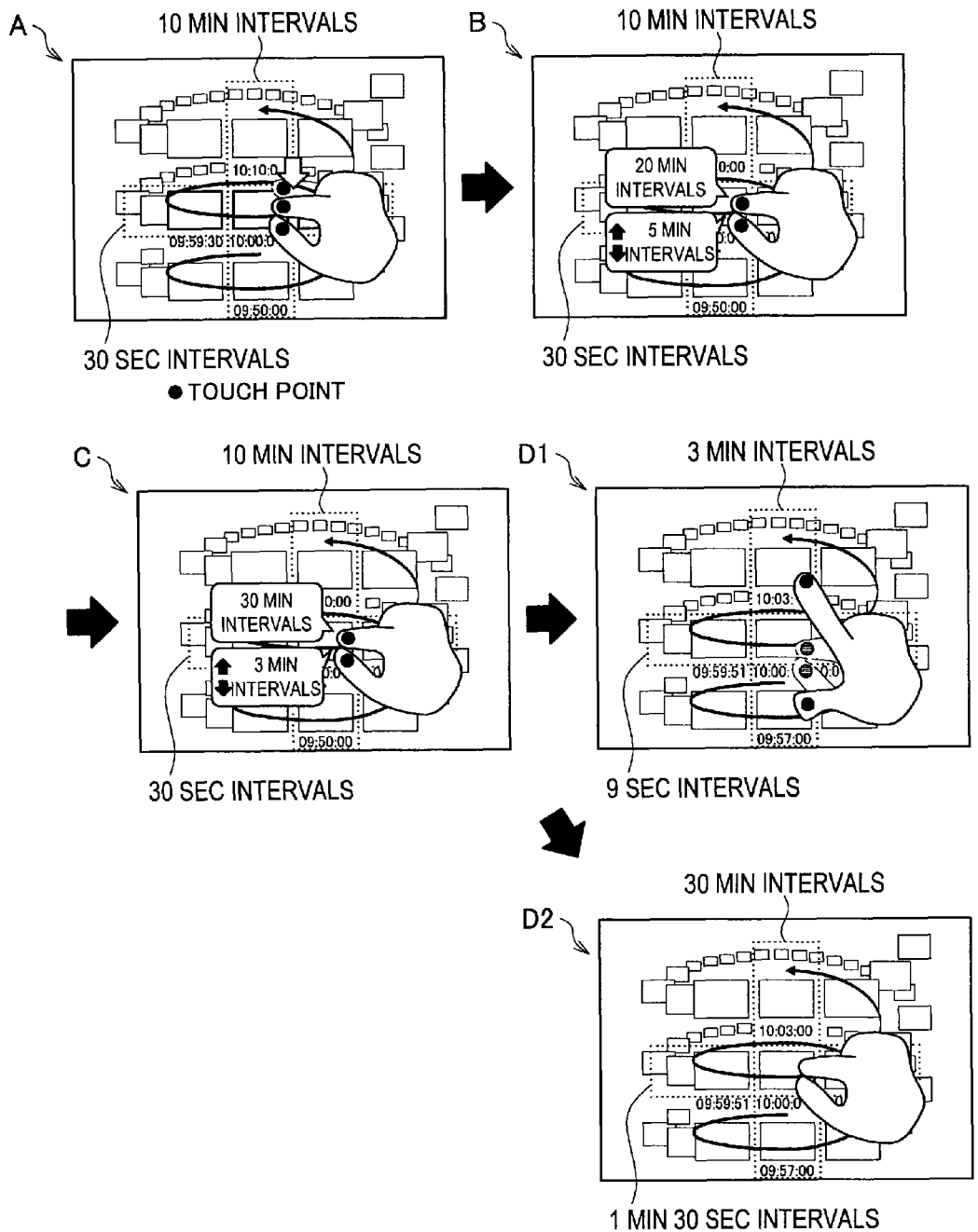
FIG. 19 is an explanatory diagram showing a ninth example of display control realized by the display control method according to the embodiment.

FIG. 19 is an explanatory diagram showing a ninth example of display control realized by the display control method according to the present embodiment. Here, FIG. 19 shows an example of a case where the display control device 100 is capable of determining a repetitive operation, and of performing a process corresponding to the repetitive operation. Also, FIG. 19 shows a case where, as in the eighth example above, text information (process result candidate) is displayed in a pop-up window.

When a pinch-in gesture is performed on the display screen (A shown in FIG. 19), the display control device 100 determines that a pinch-in gesture is performed, based on a change in the detected operation positions. Also, the display control device 100 determines a process on a time axis based on the operation positions after the pinch-in gesture, by comparing the absolute value of the difference between two operation positions in the x-axis direction and the absolute value of the difference in the y-axis direction, for example.

Furthermore, in the case the user continues the pinch-in gesture, the display control device 100 displays a pop-up window on the display screen, and displays a process result candidate in the pop-up window (B, C shown in FIG. 19). In B and C shown in FIG. 19, examples are shown where "20 min intervals," which is a process result candidate for a reduction process which corresponds to a pinch-in gesture, and "3 min intervals," which is a process result candidate for an enlargement process which corresponds to a repetitive operation, are displayed in the pop-up window. That is, in a case there are several candidates for the process to be performed based on a change in operation position(s), the display control device 100 presents to the user process result candidates each corresponding to a process, as shown in B and C of FIG. 19, for example.

When the user performs a pinch-out gesture in a state shown in C of FIG. 19, the display control device 100 determines that a repetitive operation is performed, based on the detection result of the operation positions. Then, the display control device 100 changes the display content of the display screen to correspond to a time axis corresponding to text information "3 min intervals" displayed in the pop-up window, as in the eighth example above (D1 shown in FIG. 19).

Furthermore, when the user stops the operation on the display screen in a state shown in C of FIG. 19, the display control device 100 determines a change from the first operation state to the second operation state based on the detection result of the operation positions. Then, after determining that change to the second operation state has taken place, the display control device 100 changes, as in the eighth example above, the display content of the display screen to correspond to a time axis corresponding to text information "30 min intervals" displayed in the pop-up window (D2 shown in FIG. 19).

Also in the case as shown in FIG. 19 where a process result candidate is presented, the user can cause the display control device 100 to perform desirable display without performing the pinch-in gesture or the repetitive operation several times.

Furthermore, as shown in FIG. 19, for example, by displaying, in the pop-up window, text information corresponding to a process result as a process result candidate, the display control device 100 can, as in the fifth example above, increase the convenience of the user compared to when a display control device of related art is used and enable easier recognition of the process result candidate.

Furthermore, as shown in FIG. 19, for example, by performing a process corresponding to the repetitive operation, the display control device 100 can provide a user intuitive operability which brings a spring, for example, to mind.

The display control device 100 according to the present embodiment realizes display control shown in the first to ninth examples above by using the display control method according to the present embodiment, for example. Additionally, cases have been shown in the first to ninth examples above where the target of enlargement/reduction based on a user operation is "physical size of display content" or "time axis," but it is needless to say that the targets of display control according to the present embodiment are not limited to the "physical size of display content" and the "time axis."

[Example of Process Related to Display Control Method of Present Embodiment]

Next, an explanation will be given on an example of a process related to the display control method according to the present embodiment described above. The display control device 100 controls display of a display screen based on a user operation by performing the processes of (I) to (III) below, for example.

(I) State Determination Process

The display control device 100 determines the state of an operation of a user based on the detection result of operation position(s) on the display screen. Here, as the operation state to be determined by the display control device 100 may be, for example, the first operation state, the second operation state, the third operation state, or transition between the operation states.

(II) Process Determination Process

The display control device 100 determines a process related to display that is to be performed, based on the determination result of the process of (I) (state determination process) above. For example, in a case the first operation state has been determined, the display control device 100 determines a process that is to be performed, such as an enlargement process or a reduction process, by performing determination based on a gap between two operation positions as shown in FIG. 3, for example.

(III) Display Control Process

The display control device 100 performs a process which has been determined by the process of (II) (process determination process) above to be performed, and causes display corresponding to the process which has been determined to be displayed on the display screen. Furthermore, the display control device 100 continues the display corresponding to the process which has been determined, according to the duration of determination for the process which has been determined to be performed. Additionally, the display control device 100 may display a process result candidate on the display screen, as shown in FIGS. 7 and 8, for example.

Furthermore, the display control device 100 controls display of the display screen by, for example, stopping a process, temporarily stopping (temporarily suspending) a process, or displaying display content corresponding to a process result candidate which has been selected, based on a determination result of the process of (I) (state determination process) above, such as a determination result indicating that transition of an operation state has been determined.

In the following, an example of a process related to the display control method according to the present embodiment will be more specifically described. In the following, an example of a process for a case of controlling the physical size of display content as described in the first to sixth examples of display control described above and an example of a process for a case of controlling the time axis as described in the seventh to ninth examples of display control described above will be described. Also, in the following, an example will be described, taking as an example a case where the display control device 100 performs the process related to the display control method according to the present embodiment.

(i) First Example of Process Related to Display Control Method

Figure 20:
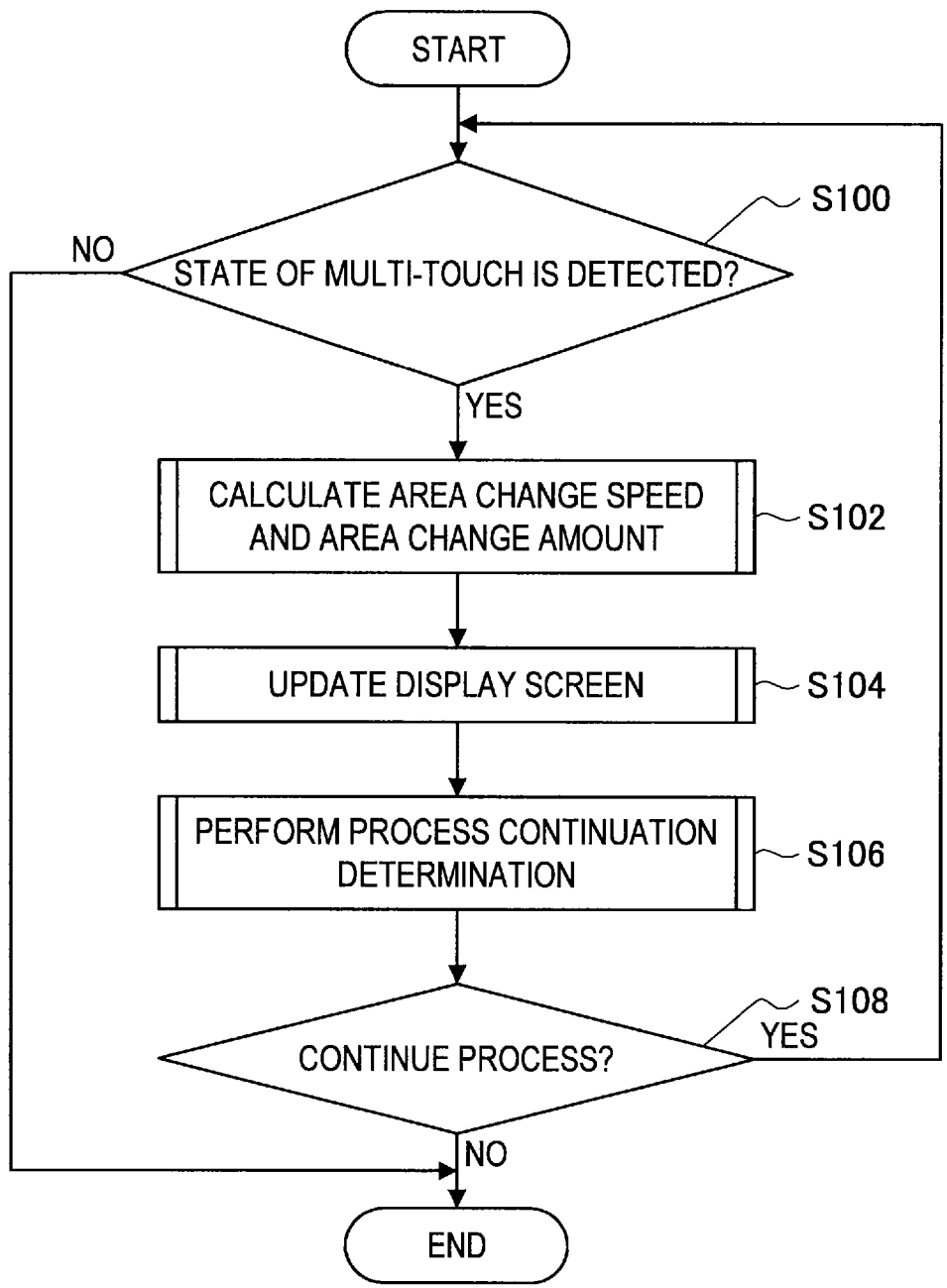
FIG. 20 is a flow chart showing a first example of a process related to the display control method according to the embodiment.

FIG. 20 is a flow chart showing a first example of a process related to the display control method according to the present embodiment. FIG. 20 shows here an example of a process for a case where the display control device 100 controls the physical size of display content.

The display control device 100 determines whether a state of multi-touch is detected or not (S100). Here, the display control device 100 determines the state of multi-touch in a case a plurality of operation positions are detected at an operation display unit (described later), for example.

In a case it is not determined in step S100 that the state of multi-touch is detected, the display control device 100 ends the process. Additionally, the process shown in FIG. 20 is not the type of process that is not performed again once it has ended, and is repeatedly performed at regular or irregular intervals. Also, although not shown in FIG. 20, the display control device 100 can perform, in a case one operation position is detected, a process corresponding to the detected operation position.

Furthermore, in a case it is determined in step S100 that the state of multi-touch is detected, the display control device 100 calculates an area change speed and an area change amount (S102: calculation process). The area change amount of the present embodiment here is a value indicating the amount of change in display, and is calculated based on the area change speed.

[Example of Calculation Process]

Figure 21:
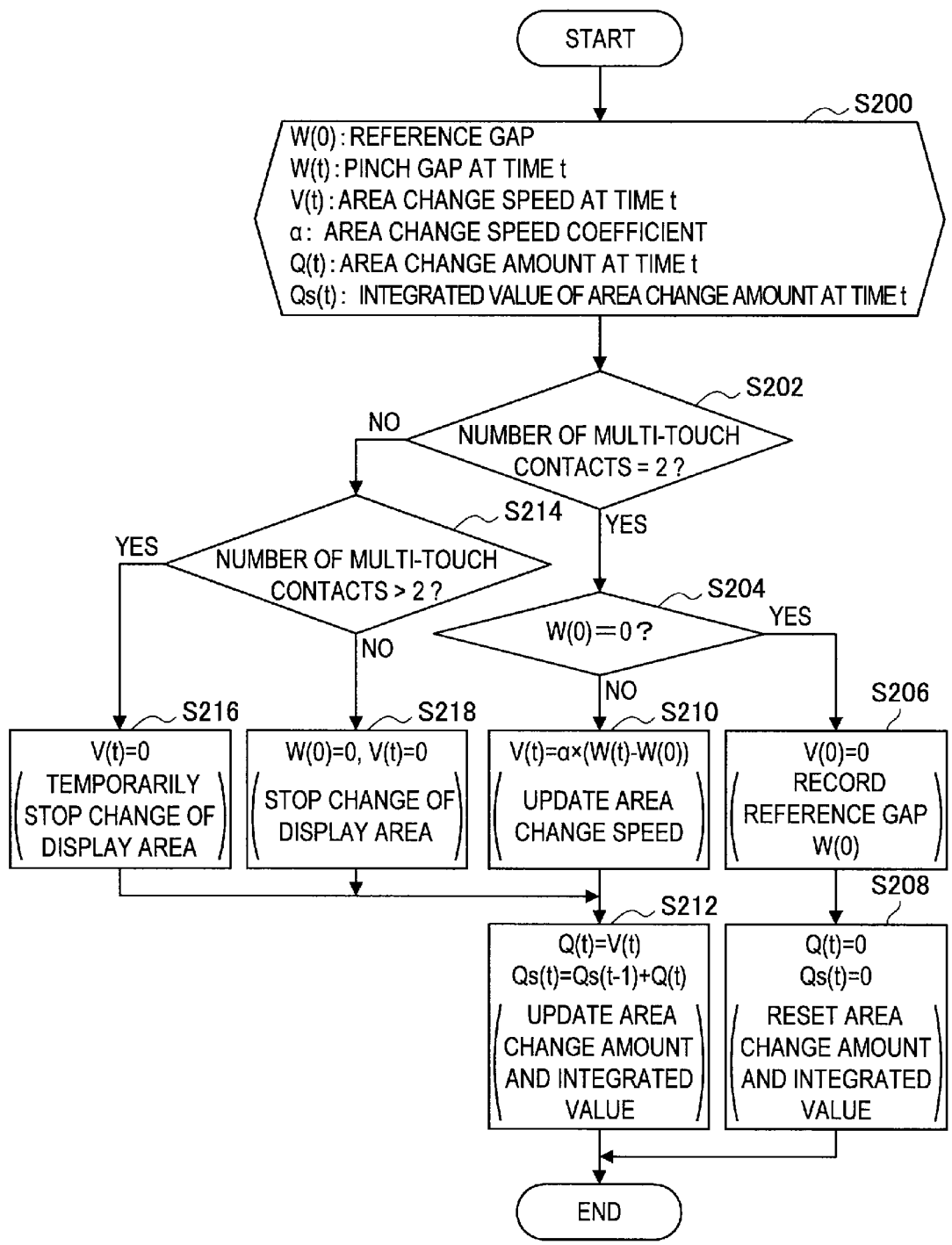
FIG. 21 is a flow chart showing an example of a calculation process, according to the embodiment, for calculating an area change speed and an area change amount.

FIG. 21 is a flow chart showing an example of a calculation process, according to the present embodiment, for calculating the area change speed and the area change amount.

The display control device 100 sets various values to be used for calculation (S200). Here, the process of step S200 corresponds to a process of reading various values from a RAM (Random Access Memory), a storage unit (described later) or the like, for example. Furthermore, in a case a value is not read, the display control device 100 may set an initial value such as "0," for example.

When the process of step S200 is performed, the display control device 100 determines whether the number of multi-touch contacts (that is, the number of operation positions which have been detected; same below) is "2" or not (S202).

In the case the number of multi-touch contacts is determined in step S202 to be "2," the display control device 100 determines whether a reference gap W(0) is "0" or not (S204).

In the case the reference gap W(0) is determined in step S204 to be "0," the display control device 100 records the reference gap as the initial value of the area change speed (S206). Also, the display control device 100 resets the area change amount and the integrated value of the area change amount (S208). Then, the display control device 100 ends the calculation process.

Furthermore, in the case it is not determined in step S204 that the reference gap W(0) is "0," the display control device 100 updates the area change speed (S210). The display control device 100 also updates the area change amount and the integrated value of the area change amount (S212). Then, the display control device 100 ends the calculation process.

In the case it is not determined in step S202 that the number of multi-touch contacts is "2," the display control device 100 determines whether the number of multi-touch contacts is greater than "2" or not (S214).

In the case the number of multi-touch contacts is determined in step S214 to be greater than "2," the display control device 100 updates the value of the area change amount to "0" (S216), and performs the process of step S212. The process of step S216 here corresponds to a process of temporarily stopping the process that is being performed, that is, a process of temporarily halting change of the display area.

Furthermore, in the case it is not determined in step S214 that the number of multi-touch contacts is greater than "2," the display control device 100 updates the value of the reference gap and the value of the area change amount to "0" (S218), and performs the process of step S212. The process of step S218 here corresponds to a process of stopping the process that is being performed, that is, a process of stopping change of the display area.

The display control device 100 calculates the area change speed and the area change amount by performing the process shown in FIG. 21, for example. Additionally, the calculation process according to the present embodiment is not limited to the process shown in FIG. 21. For example, the integrated value of the area change amount is a value used to decide the process result candidate that is to be displayed in a pop-up window, and thus, if the process result candidate is not to be presented to the user, the display control device 100 does not have to calculate the integrated value of the area change amount.

Referring back to FIG. 20, the first example of the process related to the display control method according to the present embodiment will be described. When the calculation process is performed in step S102, the display control device 100 updates the display screen (S104: display update process).

[Example of Display Update Process]

Figure 22:
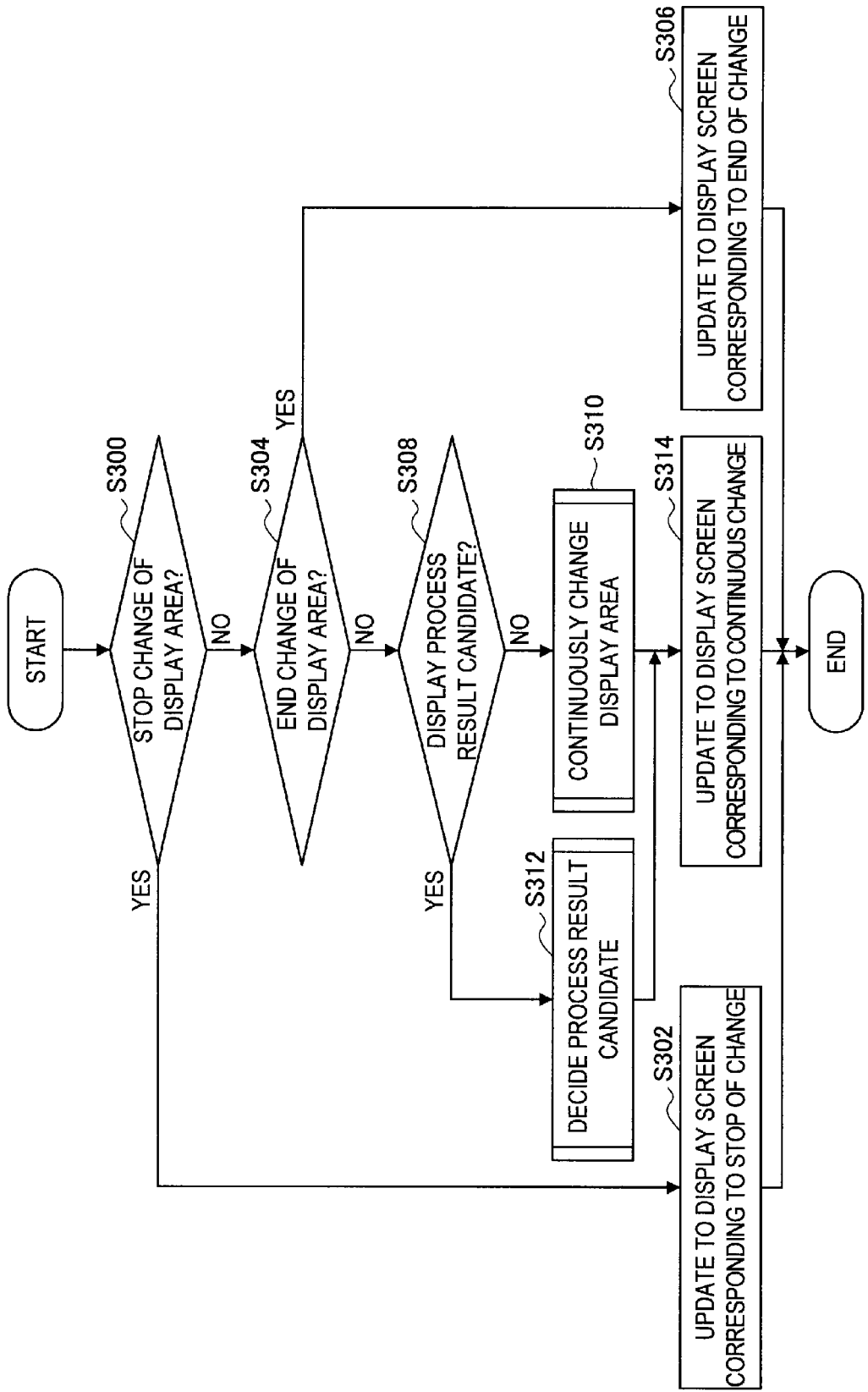
FIG. 22 is a flow chart showing an example of a display update process according to the embodiment.

FIG. 22 is a flow chart showing an example of a display update process according to the present embodiment.

The display control device 100 determines whether to stop change of the display area or not (S300). Here, the display control device 100 determines to stop change of the display area if, for example, the value of the reference gap and the value of the area change amount are "0" (for example, if the process is performed in step S218 to stop change of the display area).

In the case change of the display area is determined in step S300 to be stopped, the display control device 100 updates to a display screen corresponding to stop of change of the display area (for example, E shown in FIG. 5) (S302). Then, the display control device 100 ends the display update process.

Furthermore, in the case it is not determined in step S300 to stop change of the display area, the display control device 100 determines whether to end change of the display area or not (S304). Here, the display control device 100 determines to end change of the display area in a case a change from a first operation state to a second operation state is determined to have taken place, for example.

In the case it is determined in step S304 to end change of the display area, the display control device 100 updates to a display screen corresponding to end of change (for example, E shown in FIG. 4) based on the area change amount (S306), for example. Then, the display control device 100 ends the display update process.

Furthermore, in the case it is not determined in step S304 that change of the display area is to be ended, the display control device 100 determines whether to display a process result candidate or not (S308). Here, if a display mode for displaying a process result candidate is set, for example, the display control device 100 determines to display a process result candidate. The display mode above may be set in advance, or the user may switch between on and off, for example. Additionally, in the case the display control device 100 does not have the function of displaying a process result candidate, the display control device 100 does not have to perform the process of step S308 and the process of step S312 described later.

In the case it is not determined in step S308 to display a process result candidate, the display control device 100 continues to change the display area (S310: continuous change process).

<Example of Continuous Change Process>

Figure 23:
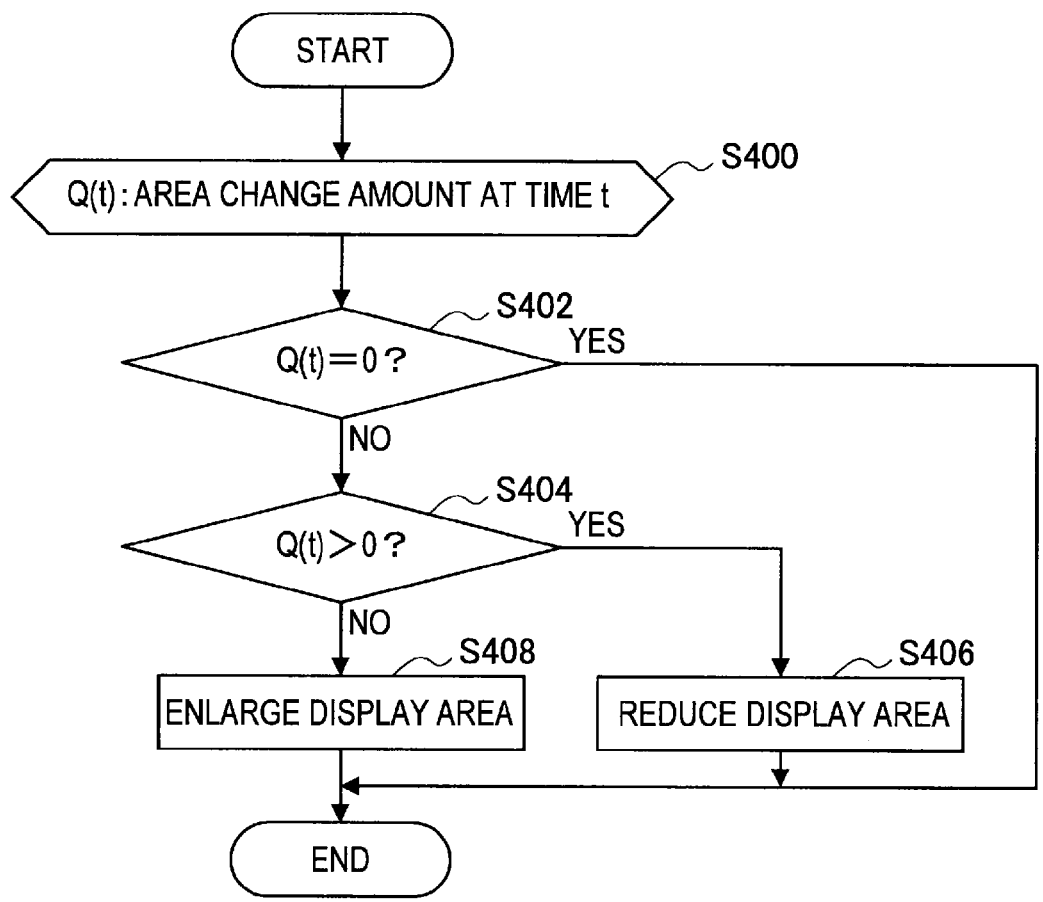
FIG. 23 is a flow chart showing an example of a continuous change process according to the embodiment.

FIG. 23 is a flow chart showing an example of a continuous change process according to the present embodiment.

The display control device 100 sets the area change amount (S400). The process of step S400 here corresponds to a process of reading the value of the area change amount from a RAM, a storage unit (described later) or the like, for example.

After the process of step S400 is performed, the display control device 100 determines whether the value of the area change amount is "0" or not (S402). In the case it is determined in step S402 that the value of the area change amount is "0," the display control device 100 ends the continuous change process.

Furthermore, in the case it is not determined in step S402 that the value of the area change amount is "0," the display control device 100 determines whether the value of the area change amount is greater than "0" or not (S404).

In the case the value of the area change amount is determined in step S404 to be greater than "0," the display control device 100 reduces the display area (S406). Then, the display control device 100 ends the continuous change process.

Furthermore, in the case it is not determined in step S404 that the value of the area change amount is greater than "0," the display control device 100 enlarges the display area (S408). Then, the display control device 100 ends the continuous change process.

The display control device 100 performs the process shown in FIG. 23, for example, as the continuous change process. Additionally, it is needless to say that the continuous change process is not limited to the process shown in FIG. 23.

Referring back to FIG. 22, an example of the display update process according to the present embodiment will be described. When the process of step S310 is performed, the display control device 100 updates to the display screen corresponding to continuous change (for example, B, C, D shown in FIG. 4) (S314). Then, the display control device 100 ends the display update process.

In the case it is determined in step S308 to display a process result candidate, the display control device 100 decides a process result candidate (S312: process result candidate decision process).

<Example of Process Result Candidate Decision Process>

Figure 24:
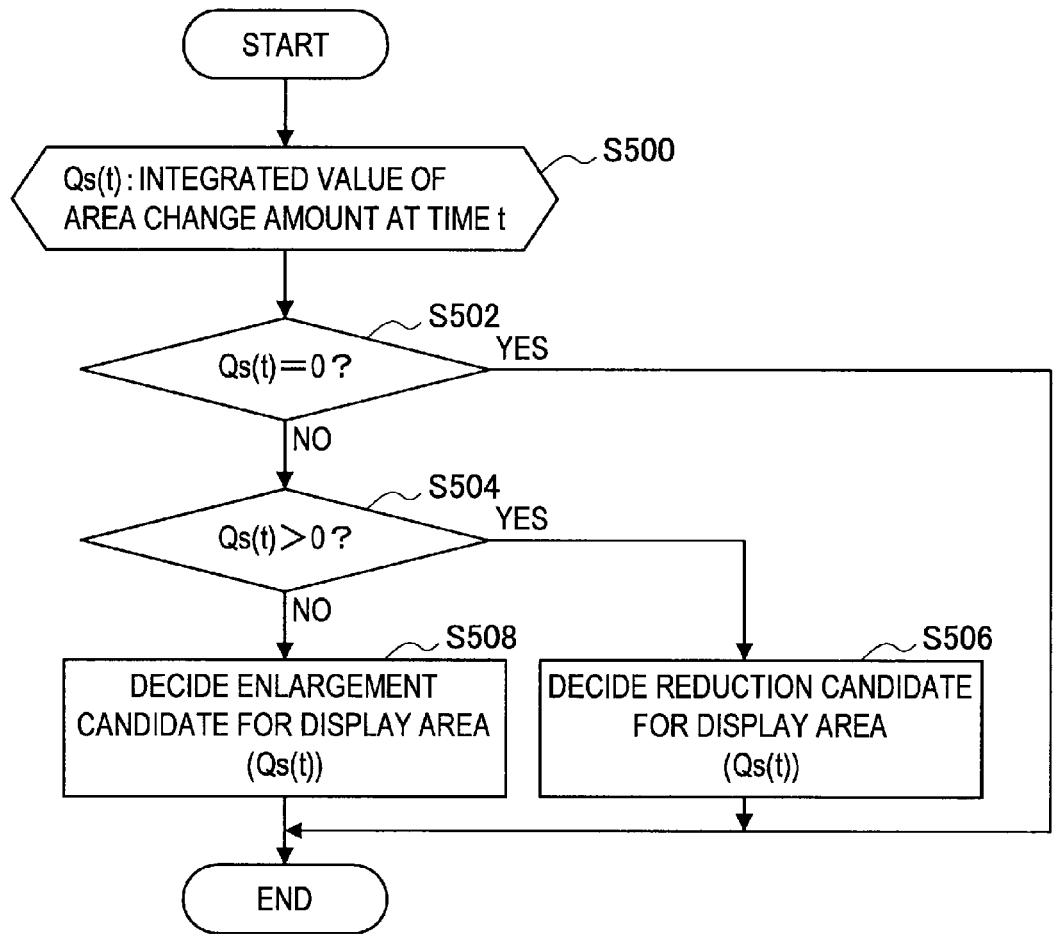
FIG. 24 is a flow chart showing an example of a process result candidate decision process according to the embodiment.

FIG. 24 is a flow chart showing an example of the process result candidate decision process according to the present embodiment.

The display control device 100 sets the integration value of the area change amount (S500). The process of step S500 here corresponds to a process of reading the integrated value of the area change amount from a RAM, a storage unit (described later) or the like, for example.

When the process of step S500 is performed, the display control device 100 determines whether the integrated value of the area change amount is "0" or not (S502). In the case the integrated value of the area change amount is determined in step S502 to be "0," the display control device 100 ends the process result candidate decision process.

Furthermore, in the case it is not determined in step S502 that the integrated value of the area change amount is "0," the display control device 100 determines whether the integrated value of the area change amount is greater than "0" or not (S504).

In the case it is not determined in step S504 that the integrated value of the area change amount is greater than "0," the display control device 100 decides a process result candidate related to enlargement (S508). The display control device 100 decides the process result candidate by using a look-up table in which an integrated value of an area change amount and a process result candidate related to enlargement are associated, but the decision method is not limited to the above. The display control device 100 then ends the display update process.

Furthermore, in the case it is determined in step S504 that the integrated value of the area change amount is greater than "0," the display control device 100 decides a process result candidate related to display area reduction (S506). Here, the display control device 100 decides the process result candidate by using a look-up table in which an integrated value of an area change amount and a process result candidate related to reduction are associated, for example, but the decision method is not limited to the above. The display control device 100 then ends the display update process.

The display control device 100 performs the process shown in FIG. 24, for example, as the process result candidate decision process. Additionally, it is needless to say that the process result candidate decision process according to the present embodiment is not limited to the process shown in FIG. 24.

Referring back to FIG. 22, an example of the display update process according to the present embodiment will be described. When the process of step S312 is performed, the display control device 100 updates to a display screen corresponding to continuous change (for example, C, D shown in FIG. 7, or B, C, D shown in FIG. 8) (S314). Then, the display control device 100 ends the display update process.

The display control device 100 performs the process shown in FIG. 22, for example, as the display update process. Additionally, it is needless to say that the display update process according to the present embodiment is not limited to the process shown in FIG. 22.

Referring back to FIG. 20, the first example of the process related to the display control method according to the present embodiment will be described. When the display update process is performed in step S104, the display control device 100 determines whether or not to continue the process (S106: continuation determination process).

[Example of Continuation Determination Process]

Figure 25:
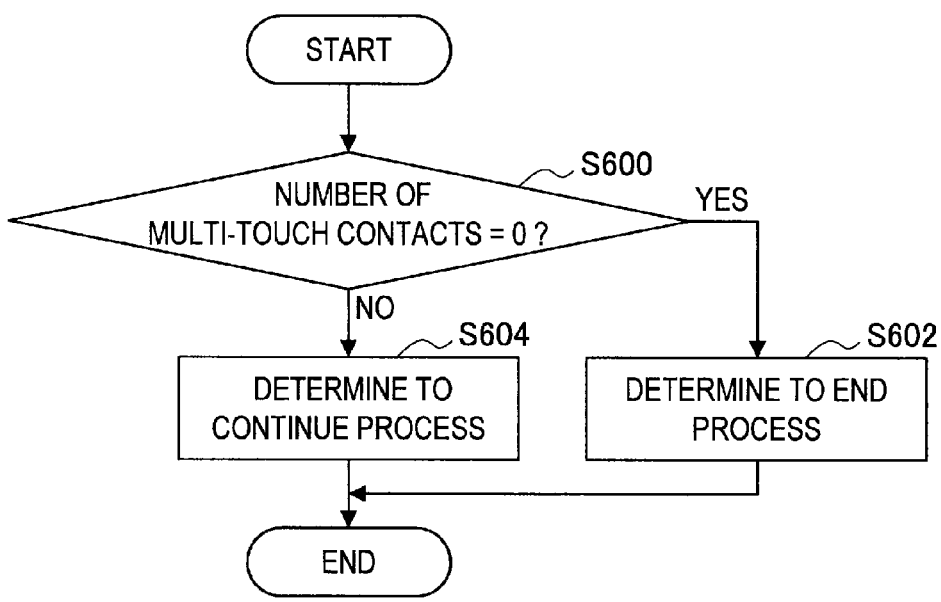
FIG. 25 is a flow chart showing an example of a continuation determination process according to the embodiment.

FIG. 25 is a flow chart showing an example of the continuation determination process according to the present embodiment.

The display control device 100 determines whether the number of multi-touch contacts is greater than "0" or not (S600). The process of step S600 corresponds to the determination of whether the first operation state or the third operation state transitioned (changed) to the second operation state, for example.

In the case the number of multi-touch contacts is determined to be "0" in step S600, the display control device 100 determines to end the process (S602), and ends the continuation determination process. Also, in the case it is not determined in step S600 that the number of multi-touch contacts is "0," the display control device 100 determines to continue the process (S604), and ends the continuation determination process.

The display control device 100 performs the process shown in FIG. 25, for example, as the continuation determination process. Additionally, it is needless to say that the continuation determination process according to the present embodiment is not limited to the process shown in FIG. 25.

Referring back to FIG. 20, the first example of the process related to the display control method according to the present embodiment will be described. When the continuation determination process is performed in step S106, the display control device 100 determines whether or not to continue the process, based on the result of the continuation determination process (S108).

When it is determined in step S106 to continue the process, the display control device 100 repeats the process from step S100. Also, in the case it is not determined in step S106 to continue the process, the display control device 100 ends the process related to the display control method.

The display control device 100 realizes control of the physical size of display content as shown in the first to sixth examples of the display control described above, for example, by performing the process shown in FIG. 20, for example. Additionally, it is needless to say that the process related to the display control method according to the present embodiment for the case of controlling the physical size of display content is not limited to the process shown in FIG. 20.

(ii) Second Example of Process Related to Display Control Method

Figure 26:
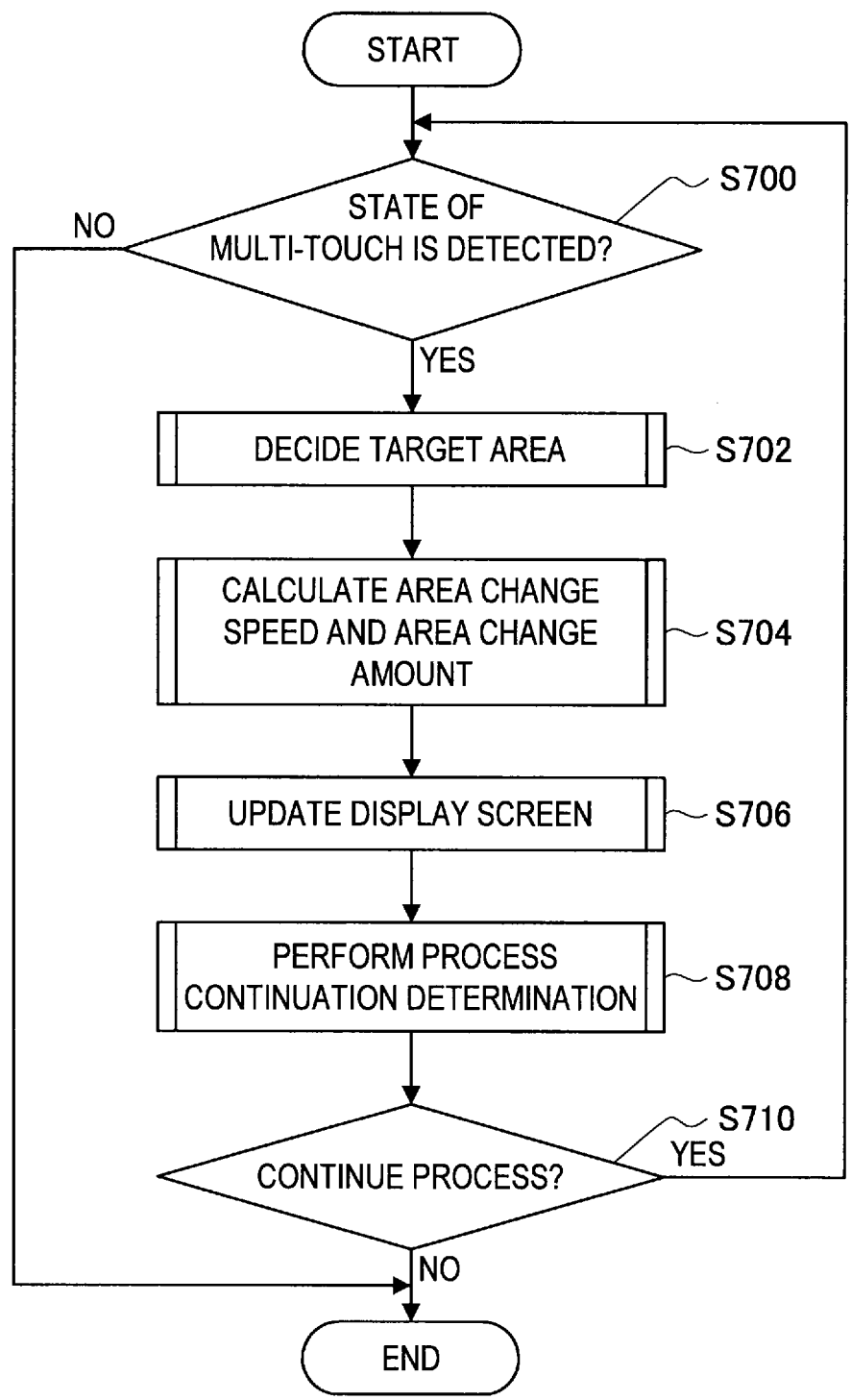
FIG. 26 is a flow chart showing a second example of the process related to the display control method according to the embodiment.

FIG. 26 is a flow chart showing a second example of the process related to the display control method according to the present embodiment. Here, FIG. 26 shows an example of a process for a case where the display control device 100 controls the time axis.

As in step S100 shown in FIG. 20, the display control device 100 determines whether a state of multi-touch is detected or not (S700). In the case it is not determined in step S700 that a state of multi-touch is detected, the display control device 100 ends the process. Additionally, the process shown in FIG. 26 is not the type of process that is not performed again once it has ended, and is repeatedly performed at regular or irregular intervals. Also, although not shown in FIG. 26, the display control device 100 can perform, in a case one operation position is detected, a process corresponding to the detected operation position.

Furthermore, in the case it is determined in step S700 that a state of multi-touch is detected, the display control device 100 decides a target area (S702: target area decision process). Here, the target area decision process according to the present embodiment corresponds to a process of deciding, as shown in FIG. 16, for example, whether to take the time axis for images that are adjacent to each other with respect to time (row of thumbnails) as the process target or to take the time axis for images that are adjacent to each other with respect to periodicity (column of thumbnails) as the process target.

[Example of Target Area Decision Process]

Figure 27:
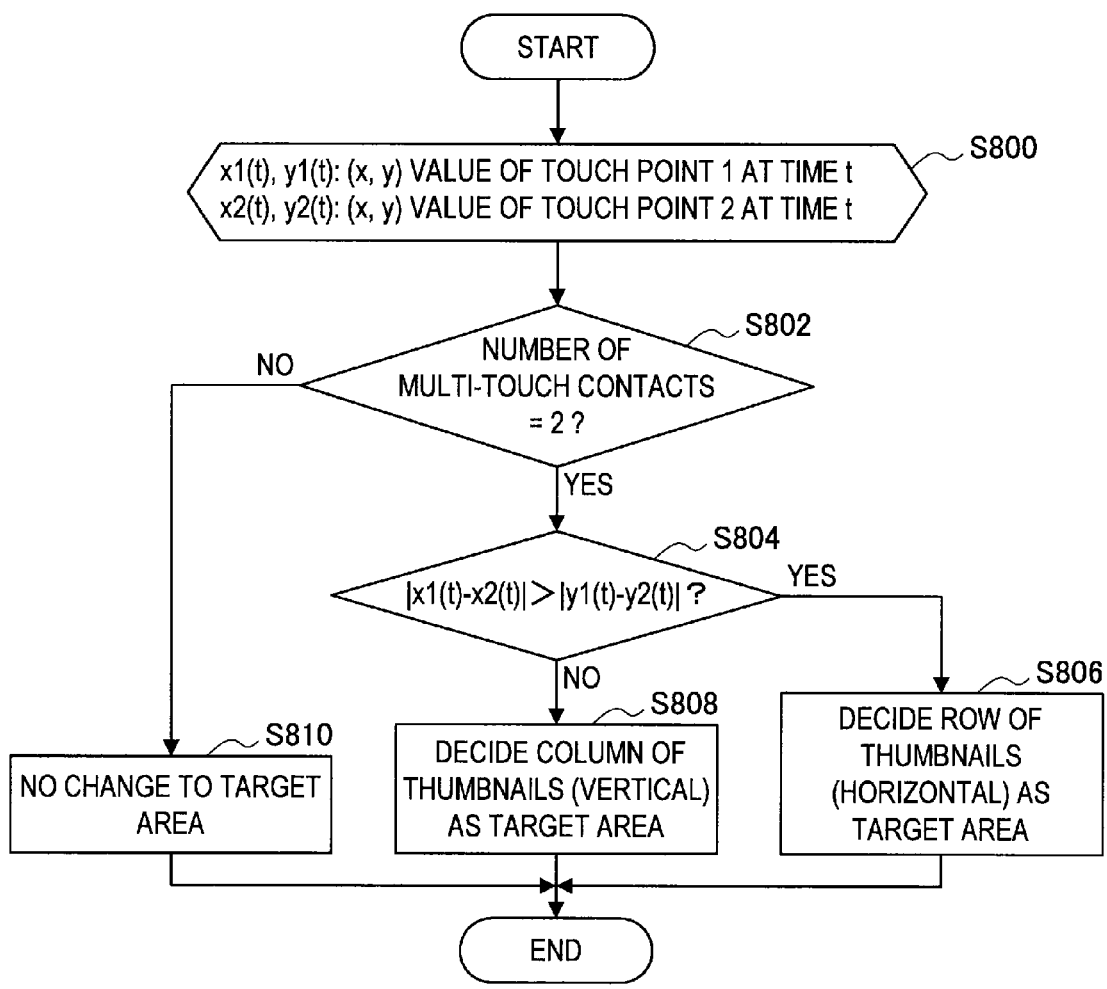
FIG. 27 is a flow chart showing an example of a target area decision process according to the embodiment.

FIG. 27 is a flow chart showing an example of the target area decision process according to the present embodiment.

The display control device 100 sets an operation position (S800). The process of step S800 corresponds to a process of reading coordinate data of an operation position (detection result of an operation display unit (described later)) from a RAM, a storage unit (described later) or the like, for example.

When the process of step S800 is performed, the display control device 100 determines whether the number of multi-touch contacts is "2" or not (S802).

In the case it is not determined in step S802 that the number of multi-touch contacts is "2," the display control device 100 makes the area that is set the target area (S810). Here, the area that is set is an area that was previously set or an area that is initially set, for example. The display control device 100 then ends the target area decision process.

Furthermore, in the case the number of multi-touch contacts is determined in step S802 to be "2," the display control device 100 determines whether or not an absolute value of a difference between two operation positions in the x-axis direction is greater than an absolute value of a difference between two operation positions in the y-axis direction (S804). Additionally, the process of step S804 is not limited to the above, and the display control device 100 may, for example, determine whether the absolute value of a difference between two operation positions in the x-axis direction is equal to or greater than the absolute value of a difference between two operation positions in the y-axis direction.

In the case the absolute value of a difference in the x-axis direction is determined to be greater than the absolute value of a difference in the y-axis direction, the display control device 100 decides images that are adjacent to each other with respect to time (row of thumbnails) as the target area (S806). Then, the display control device 100 ends the target are decision process.

Furthermore, in the case it is not determined that the absolute value of a difference in the x-axis direction is greater than the absolute value of a difference in the y-axis direction, the display control device 100 decides images that are adjacent to each other with respect to periodicity (column of thumbnails) as the target area (S808). Then, the display control device 100 ends the target area decision process.

The display control device 100 performs the process shown in FIG. 27, for example, as the target area decision process. Additionally, it is needless to say that the target area decision process according to the present embodiment is not limited to the process shown in FIG. 27.

Referring back to FIG. 26, the second example of the process related to the display control method according to the present embodiment will be described. When the target area decision process is performed in step S702, the display control device 100 calculates the area change speed and the area change amount (S704: calculation process).

[Example of Calculation Process]

Figure 28:
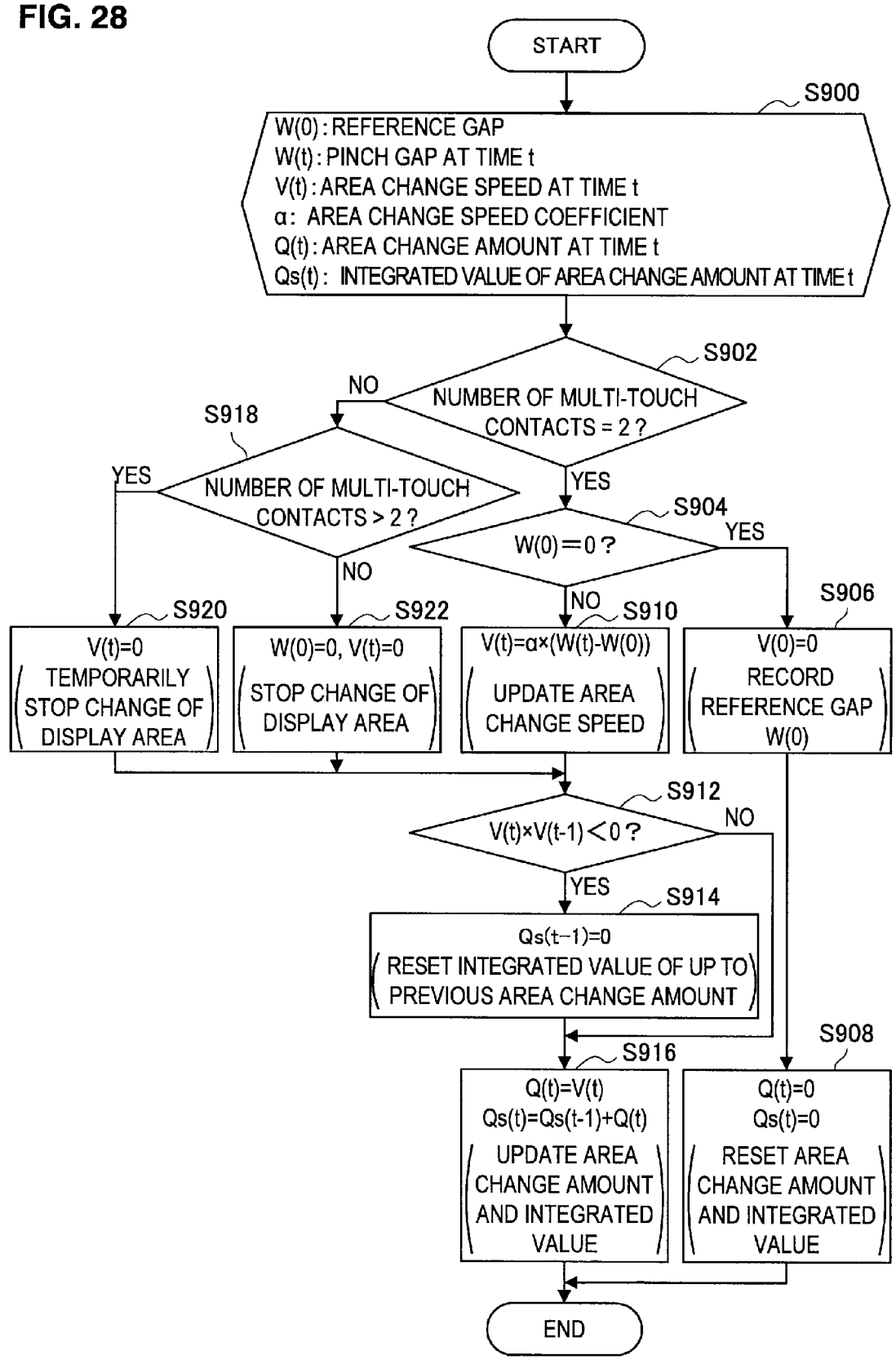
FIG. 28 is a flow chart showing another example of the calculation process, according to the embodiment, of calculating an area change speed and an area change amount.

FIG. 28 is a flow chart showing another example of the calculation process, according to the present embodiment, for calculating the area change speed and the area change amount. FIG. 28 here shows an example of the calculation process for a case where the display control device 100 controls the time axis.

As in step S200 shown in FIG. 21, the display control device 100 sets various values to be used for calculation (S900).

When the process of step S900 is performed, the display control device 100 determines, as in step S202 shown in FIG. 21, whether the number of multi-touch contacts (that is, the number of operation positions which have been detected; same below) is "2" or not (S902).

In the case the number of multi-touch contacts is determined to be "2" in step S902, the display control device 100 determines, as in step S204 shown in FIG. 21, whether a reference gap W(0) is "0" or not (S904).

In the case the reference gap W(0) is determined in step S904 to be "0," the display control device 100 records, as in step S206 shown in FIG. 21, the reference gap as the initial value of the area change speed (S906). Also, as in step S208 shown in FIG. 21, the display control device 100 resets the area change amount and the integrated value of the area change amount (S908). Then, the display control device 100 ends the calculation process.

Furthermore, in the case it is not determined in step S904 that the reference gap W(0) is "0," the display control device 100 updates the area change speed (S910), as in step S210 shown in FIG. 21.

When the process of step S910 is performed, the display control device 100 determines whether the value of the product of the currently calculated area change speed and the previously calculated area change speed is a negative value or not (S912). In the case it is not determined in step S912 that the value of the product of the currently calculated area change speed and the previously calculated area change speed is a negative value, the display control device 100 performs step S916 that is described later.

Furthermore, in the case it is determined in step S912 that the value of the product of the currently calculated area change speed and the previously calculated area change speed is a negative value, the display control device 100 resets the integrated value of the area change amount (S914). Additionally, an example is shown in FIG. 28 where the display control device 100 performs the process of step S914 in a case the value of the product of the currently calculated area change speed and the previously calculated area change speed is determined to be a negative value, but the calculation process according to the present embodiment is not limited to the above. For example, the display control device 100 may not have to perform the process of step S914 in a case the value of the product of the currently calculated area change speed and the previously calculated area change speed is determined to be a negative value.

In the case it is not determined in step S912 that the value of the product of the currently calculated area change speed and the previously calculated area change speed is a negative value or in the case the process of step S914 is performed, the display control device 100 updates the area change amount and the integrated value of the area change amount (S916), as in step S212 shown in FIG. 21. Then, the display control device 100 ends the calculation process.

In the case it is not determined in step S902 that the number of multi-touch contacts is "2," the display control device 100 determines whether the number of multi-touch contacts is greater than "2" or not (S918), as in step S214 shown in FIG. 21.

In the case the number of multi-touch contacts is determined in step S918 to be greater than "2," the display control device 100 updates the value of the area change amount to "0" (S920), as in step S216 shown in FIG. 21, and performs the process of step S912.

Furthermore, in the case it is not determined in step S918 that the number of multi-touch contacts is greater than "2," the display control device 100 updates the value of the reference gap and the value of the area change amount to "0" (S922), as in step S218 shown in FIG. 21, and performs the process of step S912.

The display control device 100 calculates the area change speed and the area change amount by performing the process shown in FIG. 28, for example. Additionally, the calculation process according to the present embodiment is not limited to the process shown in FIG. 28. For example, the integrated value of the area change amount is a value that is used for decision of a process result candidate to be displayed in a pop-up window, and thus if a process result candidate is not to be presented to a user, the display control device 100 does not have to calculate the integrated value of the area change amount. Furthermore, in the case of not performing a process corresponding to a repetitive operation, the display control device 100 does not have to perform the processes of steps S912 and S914 shown in FIG. 28.

Referring back to FIG. 26, the second example of the process related to the display control method according to the present embodiment will be described. When the calculation process is performed in step S704, the display control device 100 updates the display screen (S706: display update process). In the second example of the process related to the display control method, the display control device 100 performs, as the display update process, a process that is basically the same as step S104, shown in FIG. 20, of the first example of the process related to the display control method. Also, in the case the display control device 100 performs a process corresponding to a repetitive operation, the continuous change process is different from the process shown in FIG. 23, for example.

<Example of Continuous Change Process>

Figure 29:
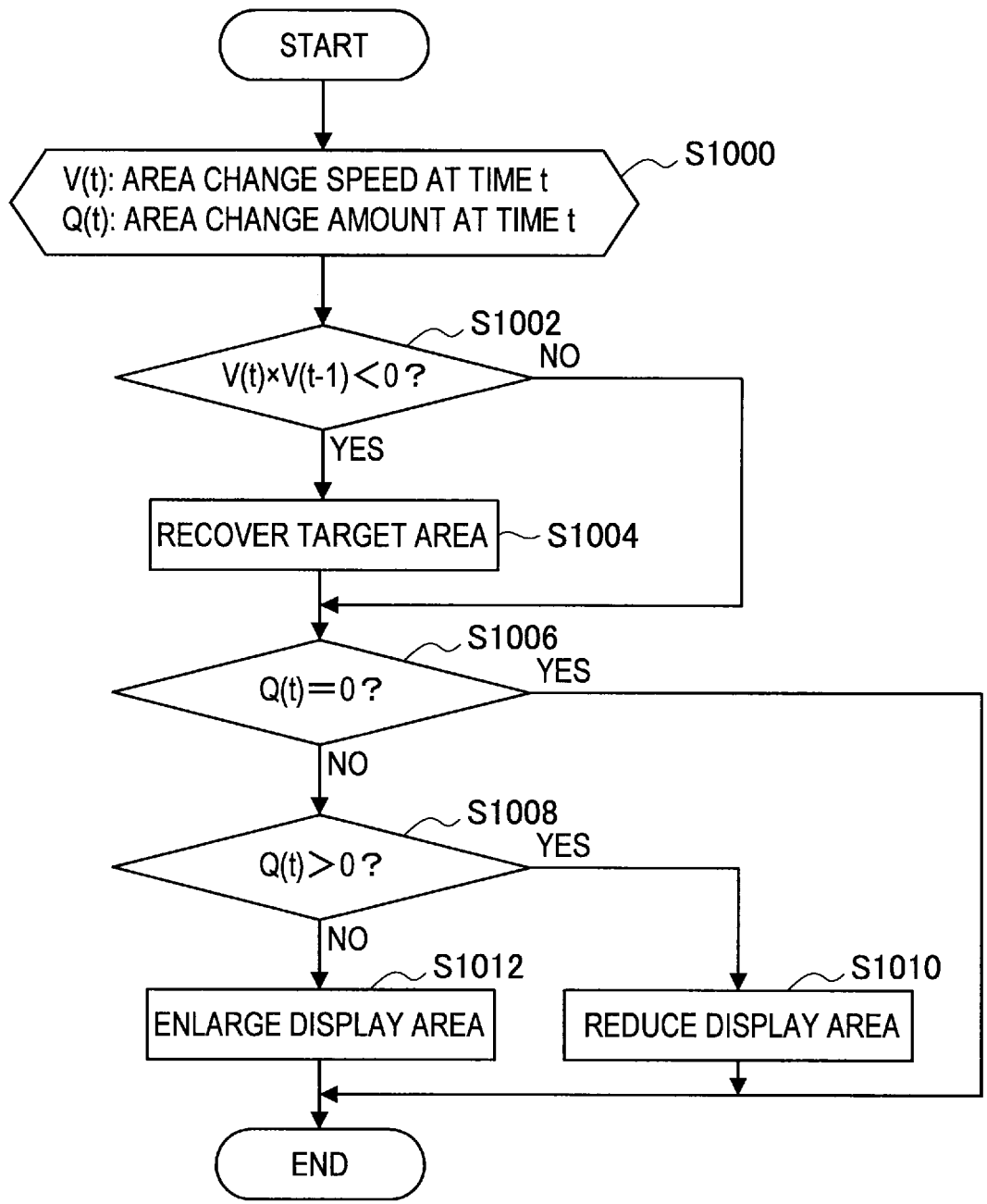
FIG. 29 is a flow chart showing another example the continuous change process according to the embodiment.

FIG. 29 is a flow chart showing another example of the continuous change process according to the present embodiment. FIG. 29 shows here an example of a process for a case where the display control device 100 performs a process corresponding to a repetitive operation. Additionally, the process shown in FIG. 29 may also be applied to the first example of the process related to the display control method described above.

The display control device 100 sets the area change speed and the area change amount (S1000). The process of step S1000 here corresponds to a process of reading the value of the area change speed and the value of the area change amount from a RAM, a storage unit (described later) or the like, for example.

When the process of step S1000 is performed, the display control device 100 determines whether the value of the product of the currently calculated area change speed and the previously calculated area change speed is a negative value or not (S1002). In the case it is not determined in step S1002 that the value of the product of the currently calculated area change speed and the previously calculated area change speed is a negative value, the display control device 100 performs the process of step S1006 described later.

Furthermore, in the case it is determined in step S1002 that the value of the product of the currently calculated area change speed and the previously calculated area change speed is a negative value, the display control device 100 recovers a target area (S1004). The recovery process of a target area here is a process of temporarily returning display content to a state before execution of a process. Additionally, an example is shown in FIG. 29 where the display control device 100 performs the process of step S1004 in a case the value of the product of the currently calculated area change speed and the previously calculated area change speed is determined to be a negative value, but the calculation process according to the present embodiment is not limited to the above. For example, the display control device 100 may not have to perform the process of step S1004 in a case the value of the product of the currently calculated area change speed and the previously calculated area change speed is determined to be a negative value.

In the case it is not determined in step S1002 that the value of the product of the currently calculated area change speed and the previously calculated area change speed is a negative value or in the case the process of step S1004 is performed, the display control device 100 determines whether the value of the area change amount is "0" or not (S1006), as in step S402 shown in FIG. 23. In the case the value of the area change amount is determined in step S1006 to be "0," the display control device 100 ends the continuous change process.

Furthermore, in the case it is not determined in step S1006 that the value of the area change amount is "0," the display control device 100 determines whether the value of the area change amount is greater than "0" or not (S1008), as in step S404 shown in FIG. 23.

In the case the value of the area change amount is determined in step S1008 to be greater than "0," the display control device 100 reduces the display area (S1010), as in step S406 shown in FIG. 23. Then, the display control device 100 ends the display update process.

Furthermore, in the case it is not determined in step S1008 that the value of the area change amount is greater than "0," the display control device 100 enlarges the display area (S1012). Then, the display control device 100 ends the display update process.

The display control device 100 performs the process shown in FIG. 29, for example, as the continuous change process. Additionally, it is needless to say that the continuous change process according to the present embodiment is not limited to the process shown in FIG. 29.

Referring back to FIG. 26, the second example of the process related to the display control method according to the present embodiment will be described. When the display update process is performed in step S706, the display control device 100 determines whether to continue the process or not (S708: continuation determination process), as in step S106 shown in FIG. 20.

When the continuation determination process is performed in step S708, the display control device 100 determines whether to continue the process or not based on the result of the continuation determination process (S710), as in step S108 shown in FIG. 20.

In the case it is determined in step S710 to continue the process, the display control device 100 repeats the process from step S700. Also, in the case it is not determined in step S710 to continue the process, the display control device 100 ends the process related to the display control method.

The display control device 100 realizes control of the time axis as shown in the seventh to ninth examples of the display control described above, for example, by performing the process shown in FIG. 26, for example. Additionally, it is needless to say that the process, for the case of controlling the time axis, related to the display control method according to the present embodiment is not limited to the process shown in FIG. 26.

(Display Control Device According to Present Embodiment)

Next, an example of a configuration of the display control device 100 according to the present embodiment capable of performing the process related to the display control method according to the present embodiment described above will be described.

Figure 30:
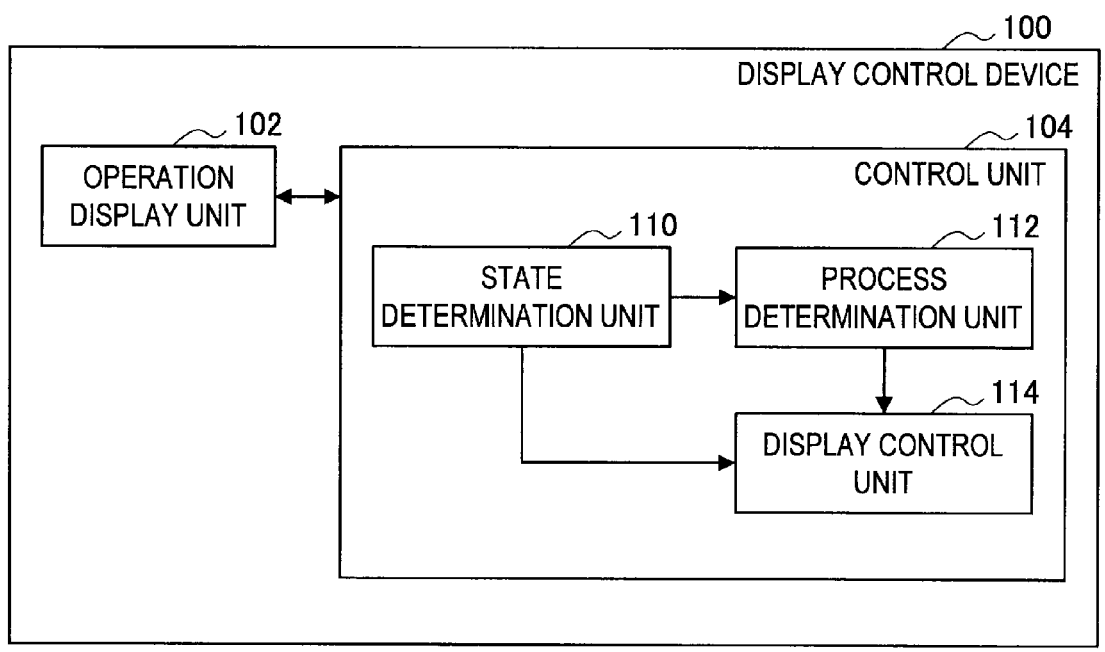
FIG. 30 is a block diagram showing an example of a configuration of the display control device according to the embodiment.

FIG. 30 is a block diagram showing an example of a configuration of the display control device 100 according to the present embodiment. The display control device 100 includes an operation display unit 102 and a control unit 104, for example.

Furthermore, the display control device 100 may also include, for example, a ROM (Read Only Memory; not shown), a RAM (not shown), a storage unit (not shown), an operation unit (not shown) that can be operated by users, a communication unit (not shown) used for communication with an external device, and the like. The display control device 100 connects the structural components mentioned above by a bus used as a data transmission channel, for example.

The ROM (not shown) stores control data such as programs and operation parameters to be used by the control unit 104, for example. The RAM (not shown) temporarily stores programs to be executed by the control unit 104, various values (operation parameters) used in the process related to the display control method according to the present embodiment described above, and the like.

The storage unit (not shown) is storage means provided in the display control device 100. Here, the storage unit (not shown) may be, for example, a magnetic recording medium such as a hard disk, a nonvolatile memory such as a flash memory, an MRAM (Magnetoresistive Random Access Memory) or a FeRAM (Ferroelectric Random Access Memory), or the like.

As the operation unit (not shown), an operation input device described later may be cited, for example. Also, as the communication unit (not shown), a communication interface described later may be cited, for example.

[Example Hardware Configuration of Display Control Device 100]

Figure 31:
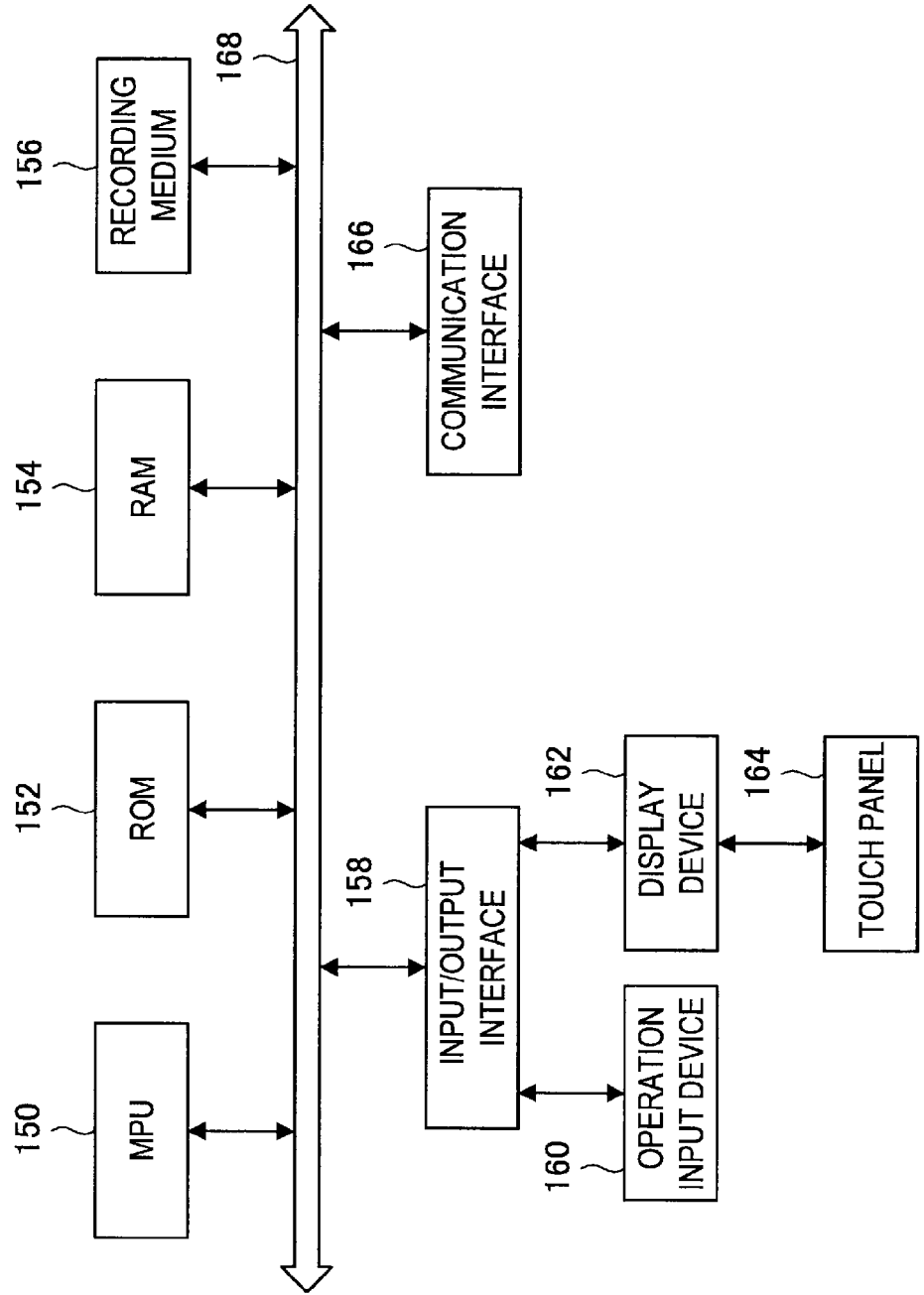
FIG. 31 is an explanatory diagram showing an example of a hardware configuration of the display control device according to the embodiment.

FIG. 31 is an explanatory diagram showing an example of a hardware configuration of the display control device 100 according to the present embodiment. The display control device 100 includes, for example, an MPU 150, a ROM 152, a RAM 154, a recording medium 156, an input/output interface 158, an operation input device 160, a display device 162, a touch panel 164 and a communication interface 166. Furthermore, the display control device 100 connects the structural components by a bus 168 used as a data transmission channel, for example.

The MPU 150 includes an integrated circuit in which an MPU (Micro Processing Unit) and various circuits for realizing control functions are integrated, and functions as the control unit 104 for controlling the entire display control device 100. Also, the MPU 150 may also serve, in the display control device 100, as a state determination unit 110, a process determination unit 112 and a display control unit 114 described later.

The ROM 152 stores control data such as programs and operation parameters to be used by the MPU 150, for example, and the RAM 154 temporarily stores programs to be executed by the MPU 150, for example.

The recording medium 156 is storage means of the display control device 100, and functions as a storage unit (not shown). The recording medium 156 stores various values used in the process related to the display control method according to the present embodiment described above, applications and the like, for example. The recording medium 156 here may be a magnetic recording medium such as a hard disk, a nonvolatile memory such as a flash memory, or the like, for example. Also, the recording medium 156 may be removable from the display control device 100.

The input/output interface 158 connects the operation input device 160 and the display device 162, for example. Here, the input/output interface 158 may be, for example, an USB (Universal Serial Bus) terminal, a DVI (Digital Visual Interface) terminal, an HDMI (High-Definition Multimedia Interface) terminal, various types of processing circuits or the like. Additionally, it is needless to say that the input/output interface 158 is capable of connecting to an operation input device (for example, a keyboard, a mouse or the like) and a display device (for example, an external display or the like) which are external devices of the display control device 100.

The operation input device 160 functions as an operation unit (not shown). Further, the operation input device 160 is, for example, provided on the display control device 100, and is connected to the input/output interface 158 within the display control device 100. The operation input device 160 may be, for example, a button, a cursor key, a rotary selector such as a jog dial, or a combination thereof.

The display device 162 functions, together with the touch panel 164, as the operation display unit 102. The display device 162 is, for example, provided on the display control device 100, and is connected to the input/output interface 158 within the display control device 100. The display device 162 may be, for example, a liquid crystal display (LCD), an organic EL display (organic ElectroLuminescence display; also referred to as an OLED display (Organic Light Emitting Diode display)) or the like.

Furthermore, the touch panel 164 that is capable of detecting one or more operation positions is provided on the display device 162. The touch panel 164 here may a capacitive touch panel, for example, but the touch panel 164 according to the present embodiment is not limited to the above. For example, the display control device 100 according to the present embodiment can be provided with a touch panel of any type that is capable of detecting one or more operation positions.

The communication interface 166 is communication means provided in the display control device 100, and functions as a communication unit (not shown) for performing wired/wireless communication with an external device via a network (or directly). The communication interface 166 here may be, for example, a communication antenna and an RF (Radio Frequency) circuit (wireless communication), a LAN (Local Area Network) terminal and a transmission/reception circuit (wired communication), or the like. Additionally, the communication interface 166 according to the present embodiment is not limited to the above, and may have a configuration compatible with a network, for example. A network according to the present embodiment is, for example, a wired network such as a LAN or a WAN (Wide Area Network), a wireless network such as a wireless WAN (WWAN; Wireless Wide Area Network) or a wireless MAN (WMAN; Wireless Metropolitan Area Network) via base stations, or the Internet using a communication protocol such as TCP/IP (Transmission Control Protocol/Internet Protocol).

The display control device 100 performs a process related to the display control method according to the present embodiment described above by, for example, the configuration shown in FIG. 31. Additionally, the hardware configuration of the display control device 100 according to the present embodiment is not limited to that shown in FIG. 31. For example, the display control device 100 may realize functions for performing the process related to the display control method according to the present embodiment (for example, functions of the state determination unit 110, the process determination unit 112 and the display control unit 114 described later) by an IC (Integrated Circuit) chip or the like. Also, configuration is possible according to which the display control device 100 does not include the display device 162 and the touch panel 164 shown in FIG. 31 but controls display at an external display device and an external touch panel. Furthermore, the display control device 100 may also include an audio output device configured from a DSP (Digital Signal Processor), an amplifier and a speaker, for example. By including the audio output device, the display control device 100 can auditorily present, using audio, a process result candidate to a user, for example.

Referring back to FIG. 30, an example of the configuration of the display control device 100 will be described. The operation display unit 102 displays a display screen, and detects one or more operation positions on the display screen based on a user operation on the display screen. Then, the operation display unit 102 transmits information on coordinates indicating an operation position, for example, to the control unit 104 as a detection result. Here, the information on coordinates is coordinate data on the display screen that is expressed with an arbitrary position on the display screen, such as the upper left corner of the display screen, as the origin, for example.

The control unit 104 is configured from an MPU, for example, and serves to control the entire display control device 100. Further, the control unit 104 includes the state determination unit 110, the process determination unit 112 and the display control unit 114, and plays a leading role in performing a process related to the display control method according to the present embodiment.

The state determination unit 110 plays a leading role in performing the process of (I) (state determination process) described above. To be specific, the state determination unit 110 determines, based on a detection result of an operation position transmitted from the operation display unit 102, various operation states, such as the first operation state, the second operation state and the third operation state, and transition (change) between the operation states, for example. Furthermore, the state determination unit 110 transmits a determination result to the process determination unit 112 and the display control unit 114, for example.

The process determination unit 112 plays a leading role in performing the process of (II) (process determination process) described above. To be specific, in a case the first operation state is determined by the state determination unit 110, for example, the process determination unit 112 determines a process to be performed, such as an enlargement process or a reduction process, by performing determination based on the gap between two operation positions, as shown in FIG. 3, for example.

Furthermore, the process determination unit 112 calculates an area change speed and an area change amount, for example. Then, the process determination unit 112 determines the type of process to be performed based on the calculated area change speed, and decides the change amount of display based on the calculated area change amount.

The process determination unit 112 also calculates an integrated value of the area change amount, for example. Additionally, in the case the display control device 100 is configured not to perform a process of presenting a process result candidate, for example, the process determination unit 112 does not have to calculate the integrated value of the area change amount.

Furthermore, the process determination unit 112 may further calculate a product of a previously calculated area change speed and a currently calculated area change speed and determine based on the value of the calculated product that a repetitive operation has been performed, and may determine a process corresponding to the repetitive operation as a process to be performed. To be specific, the process determination unit 112 determines that a repetitive operation has been performed in a case the value of the calculated product is a negative value, for example. Additionally, for example, in the case the display control device 100 is configured not to perform a process corresponding to a repetitive operation, the process determination unit 112 does not have to calculate the product described above.

Furthermore, the process determination unit 112 is also capable of determining the type of a repetitive operation based on the area change speed. To be specific, the process determination unit 112 determines the type of a repetitive operation based on whether the value of a currently calculated area change speed is positive or negative, for example. For example, the process determination unit 112 determines to perform an enlargement process in the case the value of the currently calculated area change speed is a positive value, and determines to perform a reduction process in the case the value of the currently calculated area change speed is a negative value. Additionally, determination of the type of a repetitive operation based on an area change speed by the process determination unit 112 is not limited to the above. For example, the process determination unit 112 is also capable of determining the type of a repetitive operation using the repetition rate described above.

Furthermore, the process determination unit 112 transmits a determination result to the display control unit 114, for example.

The display control unit 114 plays a leading role in performing the process of (III) (display control process) described above. To be specific, the display control unit 114 performs a process determined by the process determination unit 112 to be performed, and causes the display screen to perform display corresponding to the process which has been determined. Also, the display control unit 114 continues display corresponding to the process which has been determined to be performed, according to the duration of determination for the process.

Additionally, the display control unit 114 may display a process result candidate on the display screen, as shown in FIGS. 7 and 8, for example.

In the case of displaying a process result candidate, the display control unit 114 displays a process result candidate on the display screen without performing the process which has been determined by the process determination unit 112 to be performed, until transition from the first operation state to the second operation state is determined by the state determination unit 110, for example. The display control unit 114 here causes a process result candidate to be displayed in a pop-up window, as shown in FIGS. 7 and 8, for example, but the presentation method of the process result candidate is not limited to display using the pop-up window. For example, the display control unit 114 is also capable of notification, by sound, of content of a process result candidate. Also, the display control unit 114 displays display content (for example, display content itself or text information corresponding to display content) which would be obtained if a process is performed according to the integrated value of the area change amount calculated by the process determination unit 112, as shown in FIGS. 7 and 8, for example.

Also, in the case of displaying a process result candidate, the display control unit 114 displays display corresponds to a process result candidate in a case the state determination unit 110 determined transition from the first operation state to the second operation state, for example.

Furthermore, the display control unit 114 controls display on the display screen by stopping a process, temporarily stopping (temporarily suspending) a process or displaying display content corresponding to a selected process result candidate, based on a determination result by the state determination unit 110, such as a determination result indicating that transition between operation states have been determined, for example. For example, in a case transition from the first operation state to the third operation state has been determined by the state determination unit 110, the display control unit 114 temporarily suspends execution of a process that is being performed or changes display content of the display screen to the display content before the execution of the process that is being performed. Also, in the case the state determination unit 110 determined transition from the third operation state to the first operation state while the process is temporarily suspended, for example, the display control unit 114 may restart the execution of the process that is temporarily suspended.

The control unit 104 plays a leading role in performing a process related to the display control method according to the present embodiment by including the state determination unit 110, the process determination unit 112 and the display control unit 114, for example. Additionally, the configuration of the control unit 104 for playing a leading role in performing a process related to the display control method according to the present embodiment is not limited to the configuration shown in FIG. 30. For example, the display control device 100 according to the present embodiment may be of any configuration that is capable of realizing a process related to the display control method according to the present embodiment described above.

The display control device 100 performs a process related to the display control method according to the present embodiment described above by the configuration shown in FIG. 30, for example. The display control device 100 can therefore increase the convenience of a user. Additionally, it is needless to say that the configuration of the display control device 100 according to the present embodiment is not limited to the configuration shown in FIG. 30.

As described above, the display control device 100 according to the present embodiment determines the operation state based on an operation position on the display screen, and determines a process to be performed based on the determined operation state. Then, the display control device 100 performs the determined process, and continues the display corresponding to the process according to the duration of the process being performed. With the display control device 100 continuing the display corresponding to a process according to the duration of the process (duration of determination), a user is enabled to cause the display control device 100 to perform desirable display without the number of operations being increased and regardless of the size of the display screen, for example. Accordingly, the display control device 100 can prevent reduction in the convenience of the user caused by increase in the number of operations, and thus can increase the convenience of the user.

Furthermore, by controlling display shown in the first to ninth examples of the above-described display control, for example, the display control device 100 can increase the convenience of the user according to display control, as shown in each of the examples.

Furthermore, by performing a process according to a repetitive operation, for example, the display control device 100 can provide intuitive operability which brings a spring, for example, to mind.

An explanation has been given above taking the display control device 100 as an example of the present embodiment, but the present embodiment is not limited to such mode. The present embodiment can be applied to various appliances such as a communication device such as a mobile phone or a smartphone, a video/music playback device (or a video/music recording/playback device), a game console, a computer such as a PC (Personal Computer), a display device such as a TV receiver, and the like, for example.

(Program According to Present Embodiment)

The convenience of a user can be increased by a program for causing a computer to function as the display control device of the present embodiment (for example, a program for realizing a process related to the display control method according to the present embodiment, such as the process of (I) (state determination process) to the process of (III) (display control process) described above).

It should be understood by those skilled in the art that various modifications, combinations, sub-combinations and alterations may occur depending on design requirements and other factors insofar as they are within the scope of the appended claims or the equivalents thereof.

For example, the display control device according to the present embodiment may separately include the state determination unit 110, the process determination unit 112 and the display control unit 114 shown in FIG. 30 (for example, each can be realized by an individual processing circuit).

Furthermore, in the above, a program (computer program) for causing a computer to function as a display control device according to the present embodiment is provided, but the present embodiment can further provide a storage medium storing such a program.

The above-mentioned configuration merely shows an example of the present embodiment, and naturally falls within the technical scope of the present disclosure.

What is claimed is:

1. A display control device comprising:
a circuit configured to:
determine a first operation state based on a result of detecting one or more operation positions as first operation positions by a user;
determine, based on a change from the first operation positions to second operation positions, a process related to display that is to be performed;
cause a display screen to perform display corresponding to the process; and
continue the display corresponding to the process which has been determined to be performed, according to a duration of holding in the second operation positions,
wherein, in a case the process which has been determined is a process of changing the display by enlarging or reducing a time axis where the display screen on which a list of images arranged on the time axis is displayed is being displayed, the circuit changes the display by enlarging or reducing the time axis according to the duration of determination,
wherein the circuit causes the time axis to be displayed in a spiral manner so as to form a spiral time axis on the display screen on which the list of images are horizontally and vertically arranged, in which said spiral time axis provides a first time interval between adjacent images which are horizontally arranged and provides a second time interval between adjacent images which are vertically arranged, and in which said first time interval is different from said second time interval.

2. A display control device comprising:
a circuit configured to:
determine a first operation state based on a result of detecting one or more operation positions as first operation positions by a user;
determine, based on a change from the first operation positions to second operation positions, a process related to display that is to be performed;
cause a display screen to perform display corresponding to the process; and
continue the display corresponding to the process which has been determined to be performed, according to a duration of holding in the second operation positions,
wherein the circuit causes a time axis to be displayed in a spiral manner so as to form a spiral time axis on the display screen,
wherein a list of images are horizontally and vertically arranged on the spiral time axis,
wherein the spiral time axis provides a first time interval between adjacent images which are horizontally arranged and provides a second time interval between adjacent images which are vertically arranged, and in which the first time interval is different from the second time interval, and
wherein the circuit is further configured to:
calculate an area change speed that is based on a distance between two operation positions of the one or more operation positions that are detected and an area change amount, indicating an amount of change in the display, that is based on the area change speed,
determine a type of the process to be performed based on the area change speed which has been calculated, and
decide the amount of change in the display based on the area change amount which has been calculated,
wherein the circuit further determines, based on the detection result of the one or more operation positions, a change from the first operation state to a second operation state where the one or more operation positions are not detected,
wherein the circuit calculates an integrated value of the calculated area change amount,
wherein, in a case the circuit calculates the integrated value, the circuit:
does not perform the process which has been determined to be performed, until the circuit determines that the change to the second operation state has taken place,
causes the display screen to display a process result candidate indicating a process result which will be obtained when the process is performed according to the integrated value, and
causes the display screen to perform display corresponding to the process result candidate, when the change to the second operation state is determined to have taken place.

3. The display control device according to claim 2, wherein the circuit causes the process result candidate to be displayed in a pop-up window.

4. The display control device according to claim 2, wherein the circuit causes display content which will be obtained when the process is performed according to the integrated value to be displayed as the process result candidate.

5. The display control device according to claim 2, wherein the circuit causes text information corresponding to display content which will be obtained when the process is performed according to the integrated value to be displayed as the process result candidate.

6. A display control method comprising:

determining a first operation state based on a result of detecting one or more operation positions as first operation positions by a user;

determining, based on a change from the first operation positions to second operation positions, a process related to display that is to be performed;

causing a display screen to perform display corresponding to the process, and continuing the display corresponding to the process which has been determined to be performed, according to a duration of holding in the second operation positions, wherein, in a case the process which has been determined is a process of changing the display by enlarging or reducing a time axis where the display screen on which a list of images arranged on the time axis is displayed is being displayed, the display is changed by enlarging or reducing the time axis according to the duration of determination, wherein the time axis is caused to be displayed in a spiral manner so as to form a spiral time axis on the display screen on which the list of images are horizontally and vertically arranged, in which said spiral time axis provides a first time interval between adjacent images which are horizontally arranged and provides a second time interval between adjacent images which are vertically arranged, and in which said first time interval is different from said second time interval.

7. A non-transitory computer readable storage medium having stored thereon a program for causing a computer to perform:

determining a first operation state based on a result of detecting one or more operation positions as first operation positions by a user;

determining, based on a change from the first operation positions to second operation positions, a process related to display that is to be performed;

causing a display screen to perform display corresponding to the process, and continuing the display corresponding to the process which has been determined to be performed, according to a duration of holding in the second operation positions, wherein, in a case the process which has been determined is a process of changing the display by enlarging or reducing a time axis where the display screen on which a list of images arranged on the time axis is displayed is being displayed, the display is changed by enlarging or reducing the time axis according to the duration of determination, wherein the time axis is caused to be displayed in a spiral manner so as to form a spiral time axis on the display screen on which the list of images are horizontally and vertically arranged, in which said spiral time axis provides a first time interval between adjacent images which are horizontally arranged and provides a second time interval between adjacent images which are vertically arranged, and in which said first time interval is different from said second time interval.

* * * * *